United States Patent
Park et al.

(10) Patent No.: US 9,569,085 B2
(45) Date of Patent: Feb. 14, 2017

(54) DIGITAL DEVICE DISPLAYING INDEX INFORMATION AND METHOD FOR CONTROLLING THE SAME

(71) Applicant: LG ELECTRONICS INC., Seoul (KR)

(72) Inventors: Sihwa Park, Seoul (KR); Juhwan Lee, Seoul (KR); Sinae Chun, Seoul (KR); Doyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/594,658

(22) Filed: Jan. 12, 2015

(65) Prior Publication Data

US 2016/0170630 A1    Jun. 16, 2016

(30) Foreign Application Priority Data

Dec. 12, 2014 (KR) .................. 10-2014-0178978

(51) Int. Cl.
*G09G 5/00* (2006.01)
*G06F 3/0485* (2013.01)
*G06T 3/40* (2006.01)
*G06F 3/0488* (2013.01)
*G06F 3/0482* (2013.01)

(52) U.S. Cl.
CPC ......... *G06F 3/04855* (2013.01); *G06F 3/0482* (2013.01); *G06F 3/0488* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 2008/0288880 A1 | 11/2008 | Reponen et al. | |
| 2010/0298034 A1* | 11/2010 | Shin | G06F 3/04883 455/566 |
| 2012/0030614 A1 | 2/2012 | Tuli | |
| 2014/0059482 A1* | 2/2014 | Won | G06F 3/04855 715/787 |
| 2014/0075388 A1 | 3/2014 | Kuscher et al. | |
| 2014/0149878 A1 | 5/2014 | Mischari et al. | |

FOREIGN PATENT DOCUMENTS

KR    10-2014-0029600 A    3/2014
WO    WO 2014/119967 A1    8/2014

* cited by examiner

*Primary Examiner* — Martin Mushambo
(74) *Attorney, Agent, or Firm* — Birch, Stewart, Kolasch & Birch, LLP

(57) ABSTRACT

A digital device and a method for controlling the same are disclosed. The method for controlling a digital device comprises the steps of displaying contents and a first interface scrolling the contents in a first shape; displaying a plurality of objects included in the first interface based on a first index order; detecting a first slide touch input moving in a first direction on the first interface; scrolling a plurality of contents based on the first direction; detecting a second slide touch input moving in a second direction on the first interface; displaying the first interface in a second shape; and displaying the plurality of objects included in the first interface based on a second index order.

20 Claims, 21 Drawing Sheets

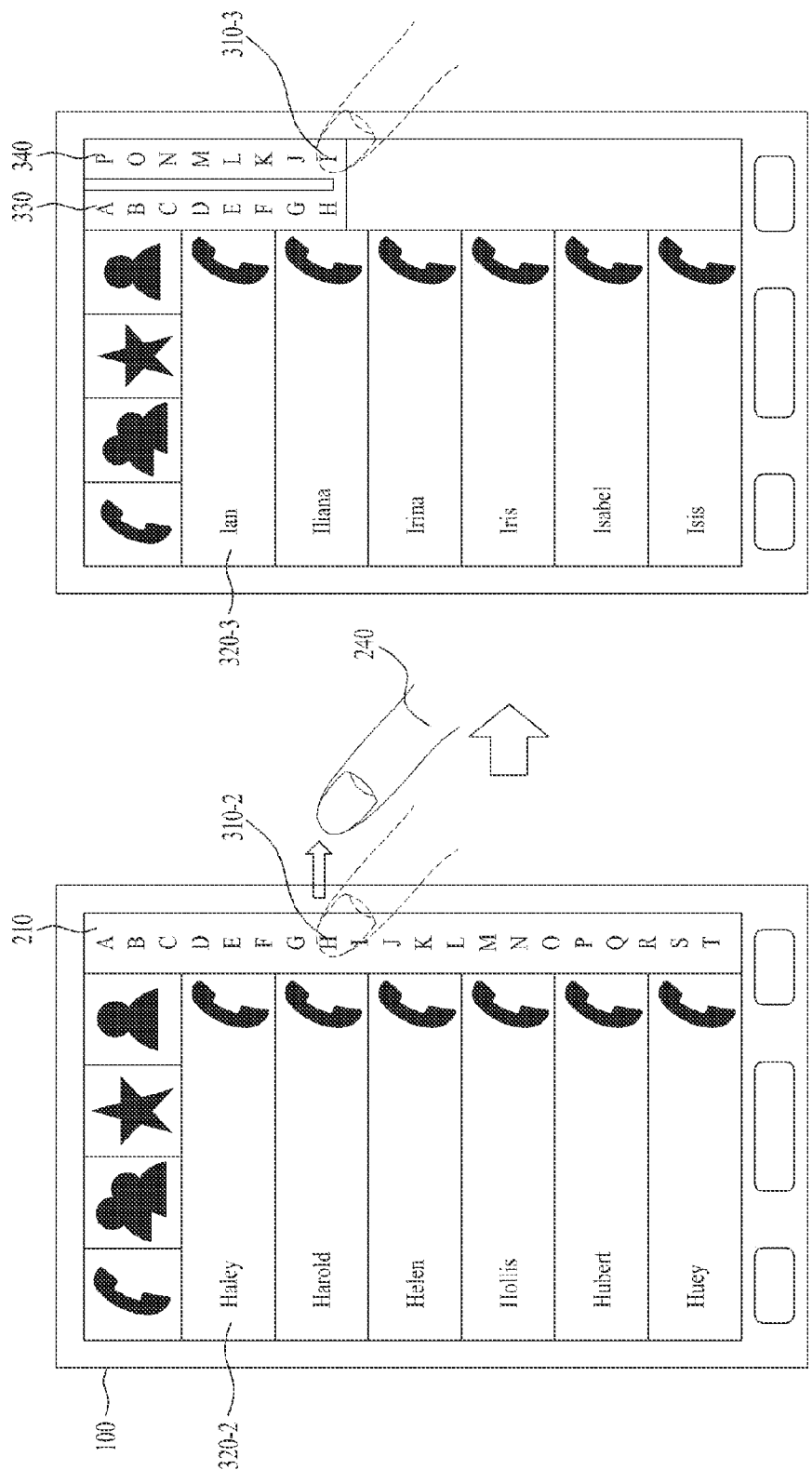

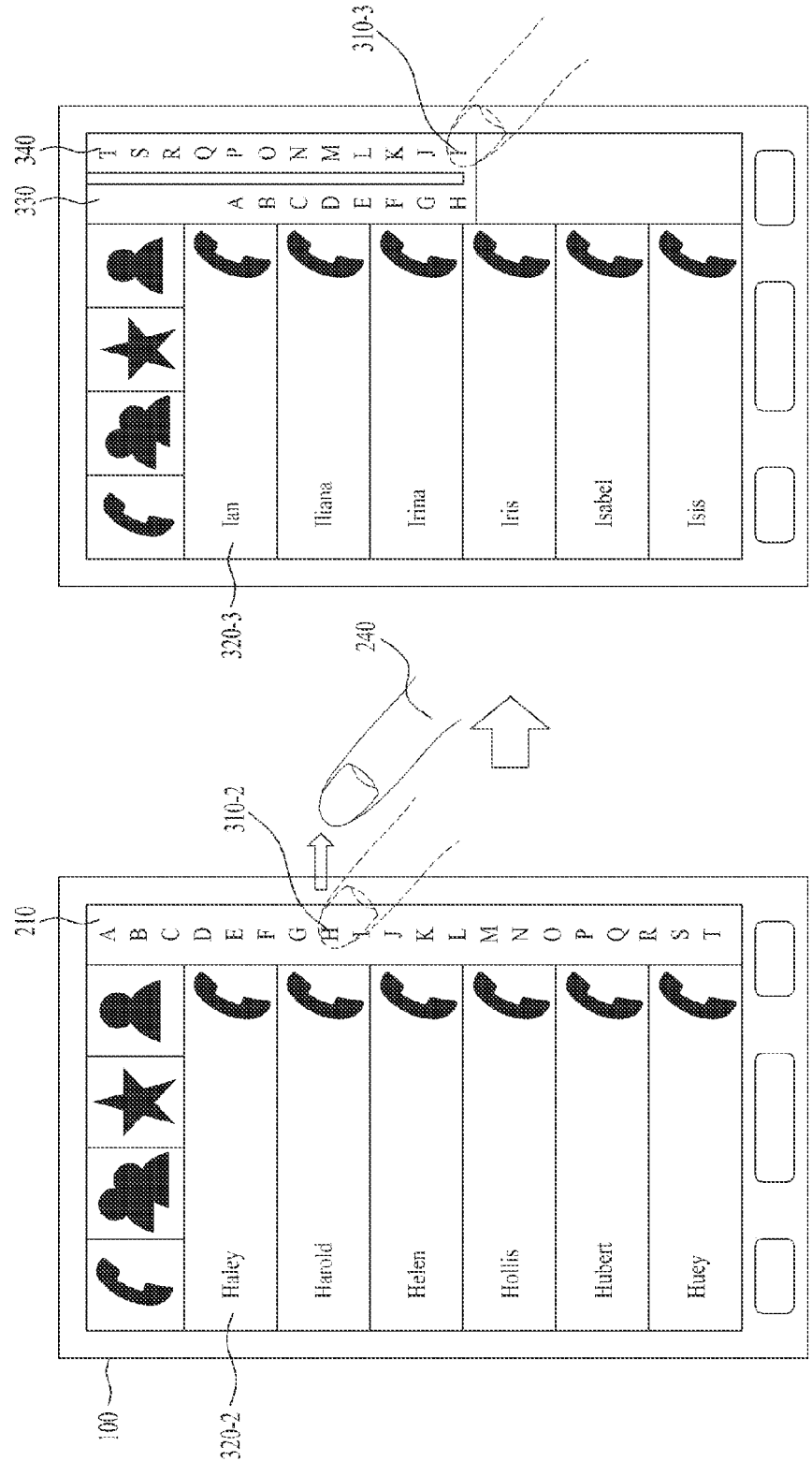

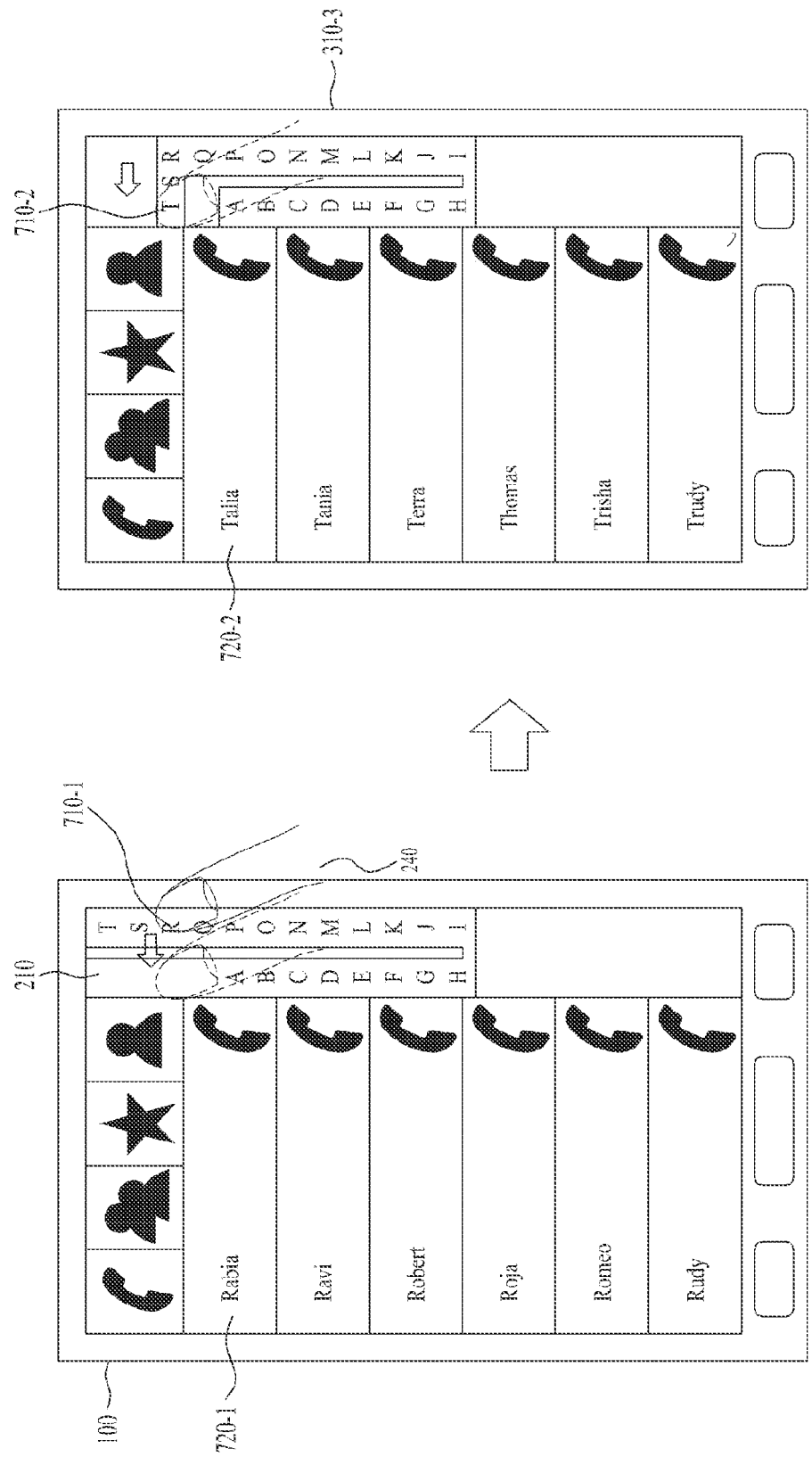

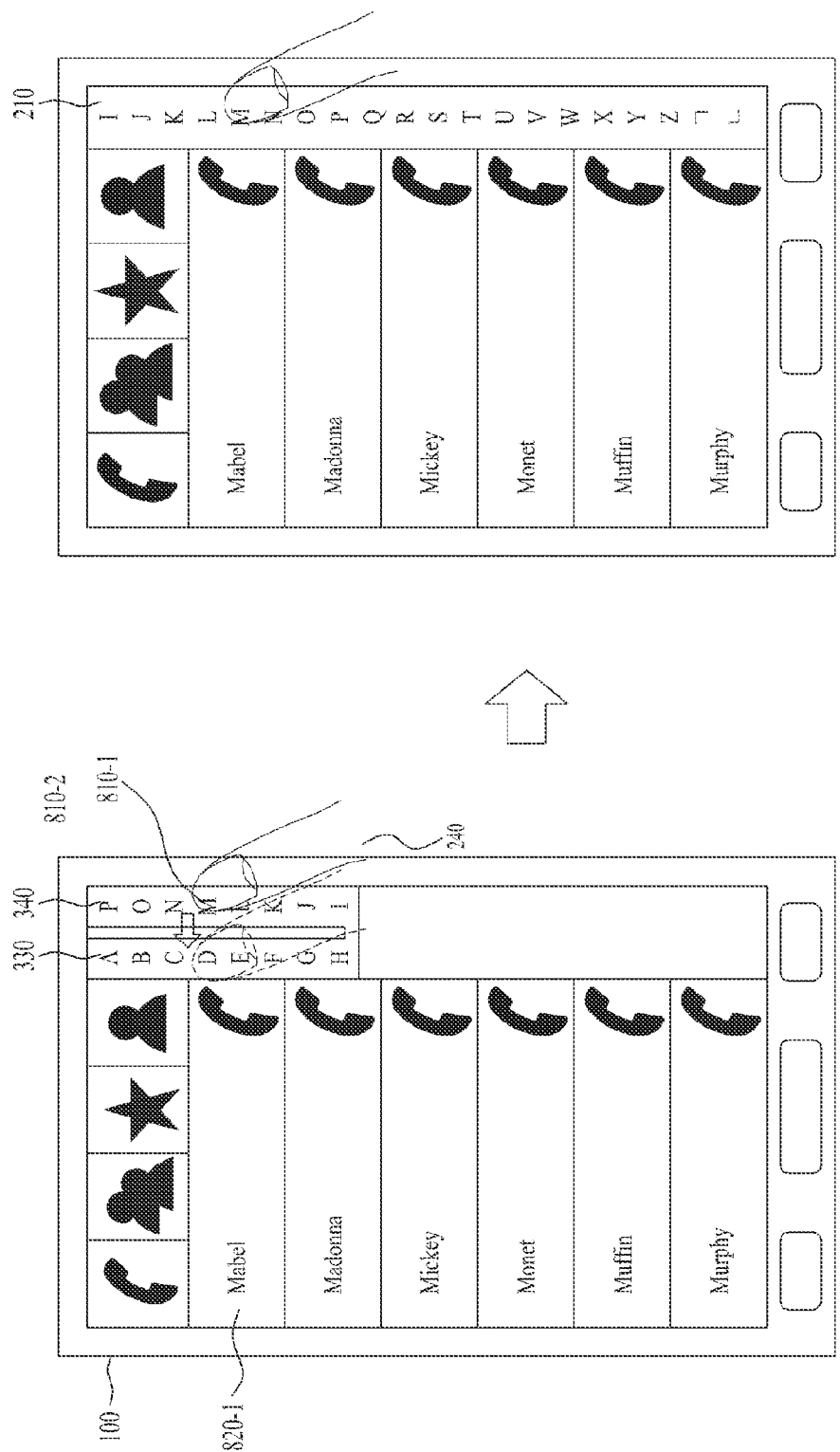

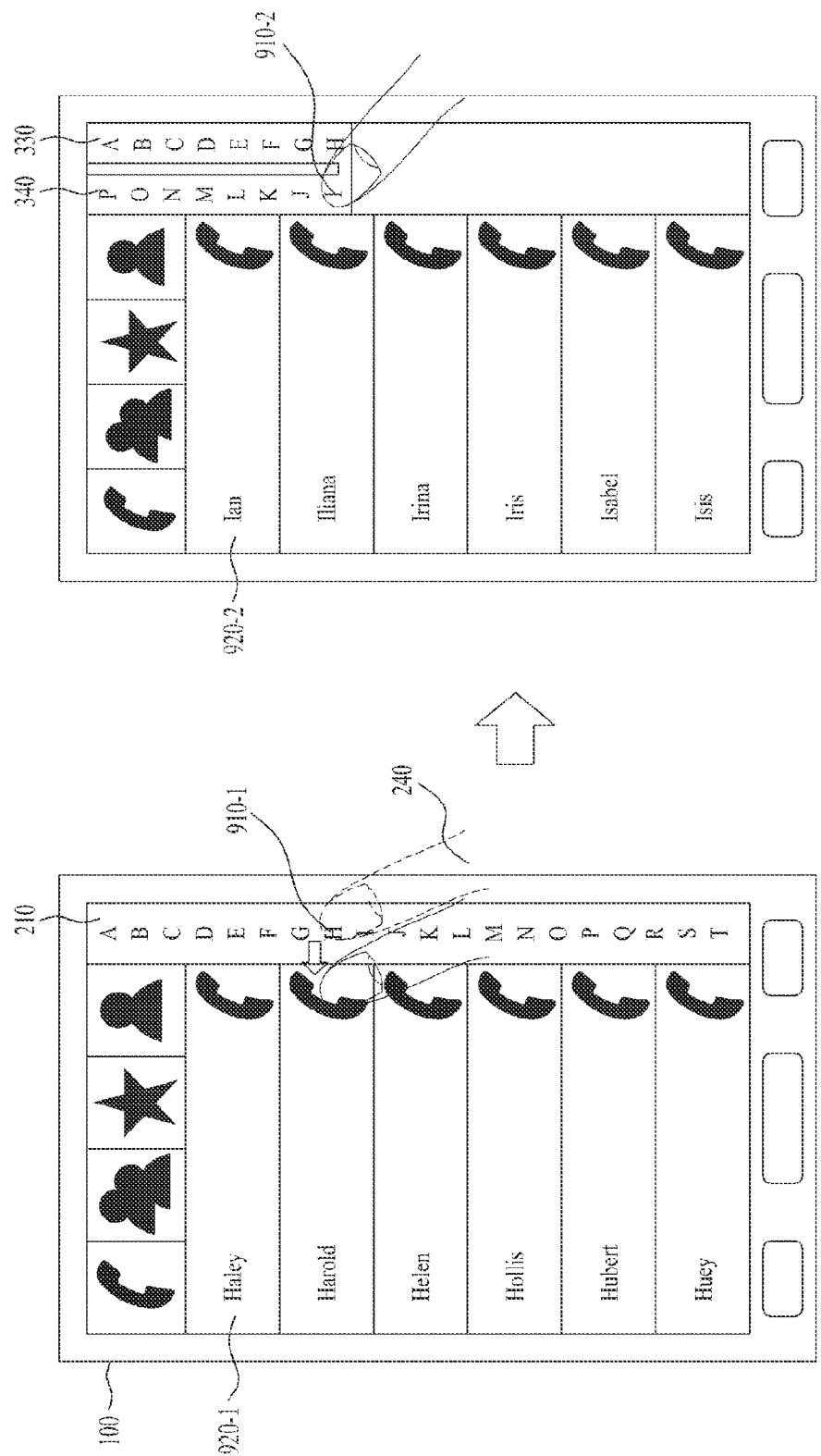

DIGITAL DEVICE DISPLAYING INDEX INFORMATION AND METHOD FOR CONTROLLING THE SAME

This application claims the benefit of the Korean Patent Application No. 10-2014-0178978, filed on Dec. 12, 2014, which is hereby incorporated by reference as if fully set forth herein.

BACKGROUND OF THE INVENTION

Field of the Invention

The present specification relates to a digital device displaying index information and a method for controlling the same.

Discussion of the Related Art

A digital device may display contents by using a display unit. In this case, the digital device may not display a plurality of related contents on one screen. In such a case, the digital device may display index information on the plurality of related contents. Also, the digital device may control a display of the contents by using a control input for the displayed index information. The index information may include a plurality of objects respectively corresponding to the plurality of contents. In this case, a method for allowing a digital device to display index information that includes a plurality of objects will be required.

SUMMARY OF THE INVENTION

Accordingly, the present specification is directed to a digital device displaying index information and a method for controlling the same, which substantially obviate one or more problems due to limitations and disadvantages of the related art.

An object of the present specification is to provide a method for allowing a digital device to display a shape of a first interface differently on the basis of a moving direction of a slide touch input.

Another object of the present specification is to provide a method for allowing a digital device to set an index order of a plurality of objects included in a first interface based on a shape of the first interface.

Still another object of the present specification is to provide a digital device that sets an index order based on content property.

Further still another object of the present specification is to provide a digital device that sets display methods of first and second parts of a first interface differently based on a shape of the first interface.

Further still another object of the present specification is to provide a method for allowing a digital device to display visual information on a front region and a side region.

Further still another object of the present specification is to provide a method for allowing a digital device to display a plurality of objects on a front region and a side region based on a shape of a first interface.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a digital device according to one embodiment of the present specification comprises a display unit configured to display contents and a first interface for scrolling the contents; a touch sensor unit configured to detect a touch input on the display unit; and a processor configured to control the display unit and the touch sensor unit. In this case, the processor may display the first interface in a first shape. In this case, the processor may display a first content corresponding to a first object if a control input, which selects the first object included in the first interface, is detected, and may display a second contents corresponding to a second object if the control input, which selects the second object included in the first interface, is detected. Also, the processor may scroll a plurality of contents based on a first direction if a first slide touch input moving in the first direction is detected from the first interface, and may display the first interface in a second shape if a second slide touch input moving in a second direction is detected from the first interface. In this case, a plurality of objects included in the first interface may be displayed based on a first index order in the first shape and displayed based on a second index order in the second shape.

In another aspect of the present specification, a method for controlling a digital device comprises the steps of displaying contents and a first interface scrolling the contents in a first shape; displaying a plurality of objects included in the first interface based on a first index order; detecting a first slide touch input moving in a first direction on the first interface; scrolling a plurality of contents based on the first direction; detecting a second slide touch input moving in a second direction on the first interface; displaying the first interface in a second shape; and displaying the plurality of objects included in the first interface based on a second index order.

According to the present specification, the digital device displaying index information and the method for controlling the same may be provided.

Also, according to the present specification, the digital device may display the shape of the first interface differently based on the moving direction of the slide touch input.

Also, according to the present specification, the digital device may set the index order of the plurality of objects included in the first interface based on the shape of the first interface.

Also, according to the present specification, the digital device may set the index order based on content property.

Also, according to the present specification, the digital device may set display methods of the first and second parts of the first interface differently based on the shape of the first interface.

Also, according to the present specification, the digital device may display visual information on the front region and the side region.

Also, according to the present specification, the digital device may display the plurality of objects on the front region and the side region based on the shape of the first interface.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIGS. 4a and 4b are diagrams illustrating a method for allowing a digital device to control a shape of a first interface based on a position where a control input is detected in accordance with one embodiment of the present specification;

FIGS. 5a and 5b are diagrams illustrating a method for allowing a digital device to display a plurality of objects in a first interface in accordance with one embodiment of the present specification;

FIG. 7 is a diagram illustrating a method for allowing a digital device to control a first interface based on a control input in accordance with one embodiment of the present specification;

FIG. 8 is a diagram illustrating a method for allowing a digital device to control a first interface based on a control input in accordance with one embodiment of the present specification;

FIGS. 9a and 9b are diagrams illustrating a method for allowing a digital device to display a shape of a first interface differently based on a direction of a slide touch input in accordance with one embodiment of the present specification;

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the embodiments of the present specification will be described in detail with reference to the accompanying drawings and the disclosure described by the drawings, it is to be understood that claims are not limited by such embodiments.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Although the terms such as "first" and/or "second" in this specification may be used to describe various elements, it is to be understood that the elements are not limited by such terms. The terms may be used to identify one element from another element. For example, a first element may be referred to as a second element or vice versa within the range that departs from the scope according to a concept of the present specification.

Also, in the specification, when a module "includes" an element, it means that the module may further include another element unless otherwise specified. The suffixes " . . . unit" and " . . . module" for the elements used in the specification are given or used to mean a unit for processing at least one function or operation, and may be implemented by combination of hardware and/or software.

Figure 1:
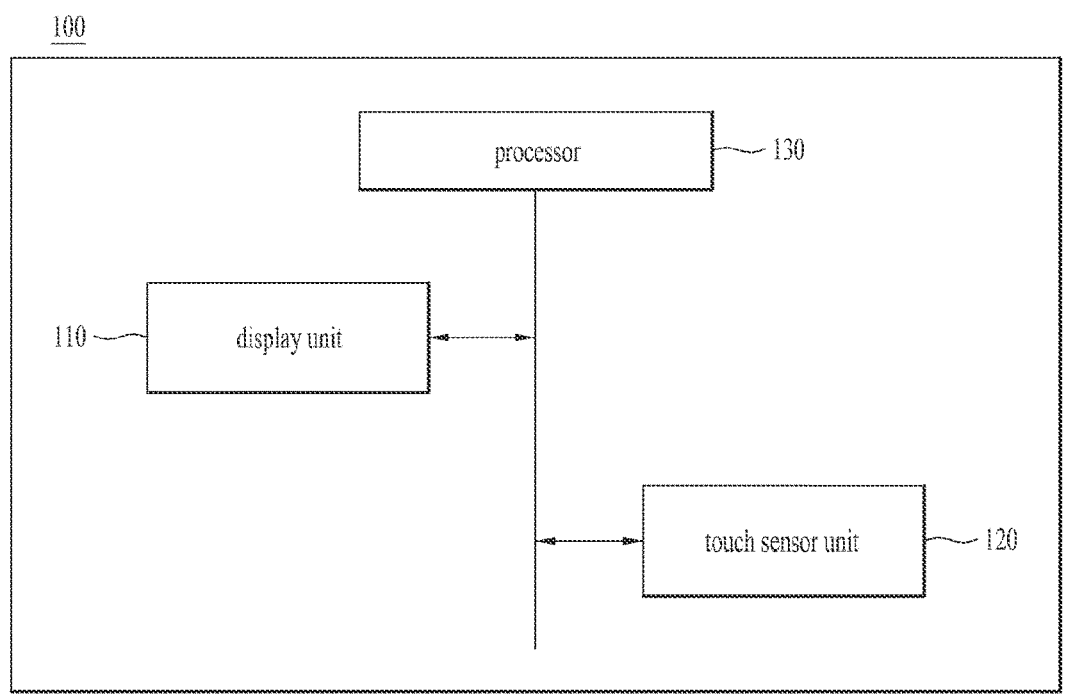
FIG. 1 is a block diagram illustrating a digital device according to one embodiment of the present specification.

FIG. 1 is a block diagram illustrating a digital device according to one embodiment of the present specification.

The digital device 100 may be a device that displays visual information and detects a control input for the visual information. For example, the digital device 100 may be a smart phone, a smart pad, a notebook computer, a head mount display (HMD), a smart watch, or a wearable device. That is, the digital device 100 may be a device that displays visual information and controls the visual information, and is not limited to the aforementioned example.

The digital device 100 may include a display unit 110, a touch sensor unit 120, and a processor 130. For example, the respective units may be elements or parts constituting the digital device. In other words, each unit may be one independent unit housed in the digital device 100 to implement the functions of the digital device 100, and is not limited to the aforementioned example.

The display unit 110 may be controlled by the processor 130. At this time, the display unit 110 may display visual information. The visual information may be contents, or interface that scrolls contents. For example, the contents may be applications, icons, stored contact addresses, stored images, and stored bookmark lists. In more detail, the contents may be visual information displayed in a given order. For example, if a user implements an application for contact addresses, each of the contact addresses which are stored individually may be one content. In other words, a plurality of contents may be included in the contact address application. For example, if a gallery application is implemented, one image may be one content. For another example, if the gallery application is implemented, a folder, which includes a plurality of images based on date or stored order, may be one content. For still another example, if a web browser application is implemented, each address of bookmarks may be a content. For example, one folder, which includes a plurality of addresses, may be a content. Also, for example, an interface that scrolls contents may be an index interface. In more detail, the interface that scrolls contents may include a plurality of objects corresponding to a plurality of contents. At this time, for example, if the digital device 100 detects a control input that scrolls an interface, the digital device 100 may display a plurality of contents by scrolling the plurality of contents based on the control input. In other words, the contents may be visual information scrolled by the index interface, and are not limited to the aforementioned examples.

Also, the display unit 110 may display the visual information on a front region and a side region of the digital device 100. In more detail, the digital device 100 may display the visual information even on the side region as well as the front region. At this time, for example, one display panel may be included in the digital device 100. At this time, the display panel may be made of a flexible material. Also, the display panel may be included in the digital device 100 in a shape bent at a certain curvature. At this time, an area of the display panel, which is not bent and is located at the front of the digital device 100, may be a first display area. Also, an area of the display panel, which is located at the side of the digital device 100 at a certain curvature, may be a second display area. At this time, for example, the first display area and the second display area may be identified from each other by at least one edge. The edge may be designed to identify the first display area from the second display area during housing of the digital device 100. In other words, the display unit 110 may use each of the front region and the side region of the digital device 100 as an independent display area by identifying the front region and the side region from each other. In this case, for example, the front region and the side region may be the areas identified from each other by the edge.

The digital device 100 may include the touch sensor unit 120. The touch sensor unit 120 may forward a user input or an environment recognized by the device to the processor 130 by using at least one sensor provided in the digital device 100. In more detail, the touch sensor unit 120 may sense a control input of the user by using at least one sensor provided in the digital device 100. In this case, the sensing means may be a touch sensor. That is, the touch sensor unit 120 is a control input that selects the visual information displayed by the display unit 110, and may detect a touch input.

For another example, the digital device 100 may include various sensing means for sensing a control input, such as a finger print sensor, a motion sensor, a proximity sensor, an illumination sensor, a voice recognition sensor, and a pressure sensor. That is, the digital device 100 may include a unit for sensing the control input of the user, thereby controlling the visual information displayed in the display unit 110.

For another example, the display unit 110 and the touch sensor unit 120 may be one touch sensitive display unit. In more detail, the touch sensitive display unit may display visual information and at the same time detect a touch input. As a result, the digital device 100 may control the displayed visual information.

The processor 130 may be a unit that controls at least one of the display unit 110 and the touch sensor unit 120. In more detail, the processor 130 may display a first interface that scrolls contents by using the display unit 110. At this time, as described above, the first interface may be an index interface indicating index information on the content. Also, the content may be visual information that corresponds to index information and may be scrolled by the first interface, and is not limited to the aforementioned example.

Also, the processor 130 may display the first interface in a first shape. For example, the processor 130 may display a first content corresponding to a first object if a control input for selecting the first object included in the first interface is detected. At this time, the control input may be a touch input. Also, for example, the processor 130 may display a second content corresponding to a second object if a control input for selecting the second object included in the first interface is detected. That is, the plurality of objects included in the first interface may be the objects corresponding to the plurality of contents scrolled by the first interface. At this time, the first shape may be set based on a direction in which the plurality of content are displayed. In more detail, the plurality of content may be displayed based on a predetermined order. At this time, the predetermined order may be names of contents, the occurrence order of contents, etc. In this case, the plurality of contents may be displayed in a vertical direction based on the predetermined order. The first shape may be the shape of the plurality of objects arranged in a vertical direction. Also, if the plurality of content are displayed in a horizontal direction based on the predetermined order, the first shape may be the shape of the plurality of objects arranged in a horizontal direction. That is, the first shape of the first interface may be displayed based on the direction or the shape in which the plurality of contents are displayed.

At this time, the processor 130 may detect a first slide touch input moving in a first direction within the first interface by using the touch sensor unit 120. In this case, the processor 130 may scroll the plurality of contents based on the first direction. For example, the first direction may be a moving direction within the first interface. The first direction may be the same as the direction in which the plurality of contents are displayed. Also, the processor 130 may detect a second slide touch input moving in a second direction from the first interface. At this time, the processor 130 may display the first interface in a second shape. The second shape may be set based on the second direction in which the second slide touch input is moving. In more detail, the second direction may be the direction from the inside of the first interface to the outside of the second interface. That is, if the processor 130 detects the slide touch input moving to the outside of the first interface, the processor 130 may change the shape of the first interface in accordance with the second slide touch input which is moving. In other words, the shape of the first interface may be changed based on the moving direction of the second slide touch input. For example, the first shape may be a rectangular shape in a vertical direction. Also, the second shape may be a shape such as alphabet "U" based on the second slide touch input, which will be described later with reference FIG. 3b.

Also, the processor 130 may display the plurality of objects included in the first interface based on a first index order in accordance with the first shape. Also, the processor 130 may display the plurality of objects included in the first interface based on a second index order in accordance with the second shape. At this time, for example, the first index order may be set based on the displayed order of the plurality of contents. For example, the first index order may be a language arrangement order. For example, if the plurality of contents are contact addresses and the contact addresses are displayed based on the alphabet order, the first index order may be the alphabet order. At this time, the plurality of objects may be alphabets. In other words, the first index order may display alphabets which are the plurality of objects, in the same manner as the displayed order of the plurality of contents. Also, the second index order may be set based on the second shape. In more detail, the second shape may be "U" shape. At this time, the plurality of objects may be alphabets, and the plurality of contents may be contact addresses displayed in the alphabet order. At this time, the second index order may display the plurality of objects in some area within the first interface 210 in an opposite direction of the displayed order of the contents. For example, the second index order may be a continuous order based on the first interface but may be an arrangement order in an opposite direction with respect to the plurality of contents, which will be described later with reference to FIG. 3b.

Also, the aforementioned elements may be included in the digital device 100 as separate elements, or may be included in the digital device 100 by being incorporated into at least one element.

Figure 2A:
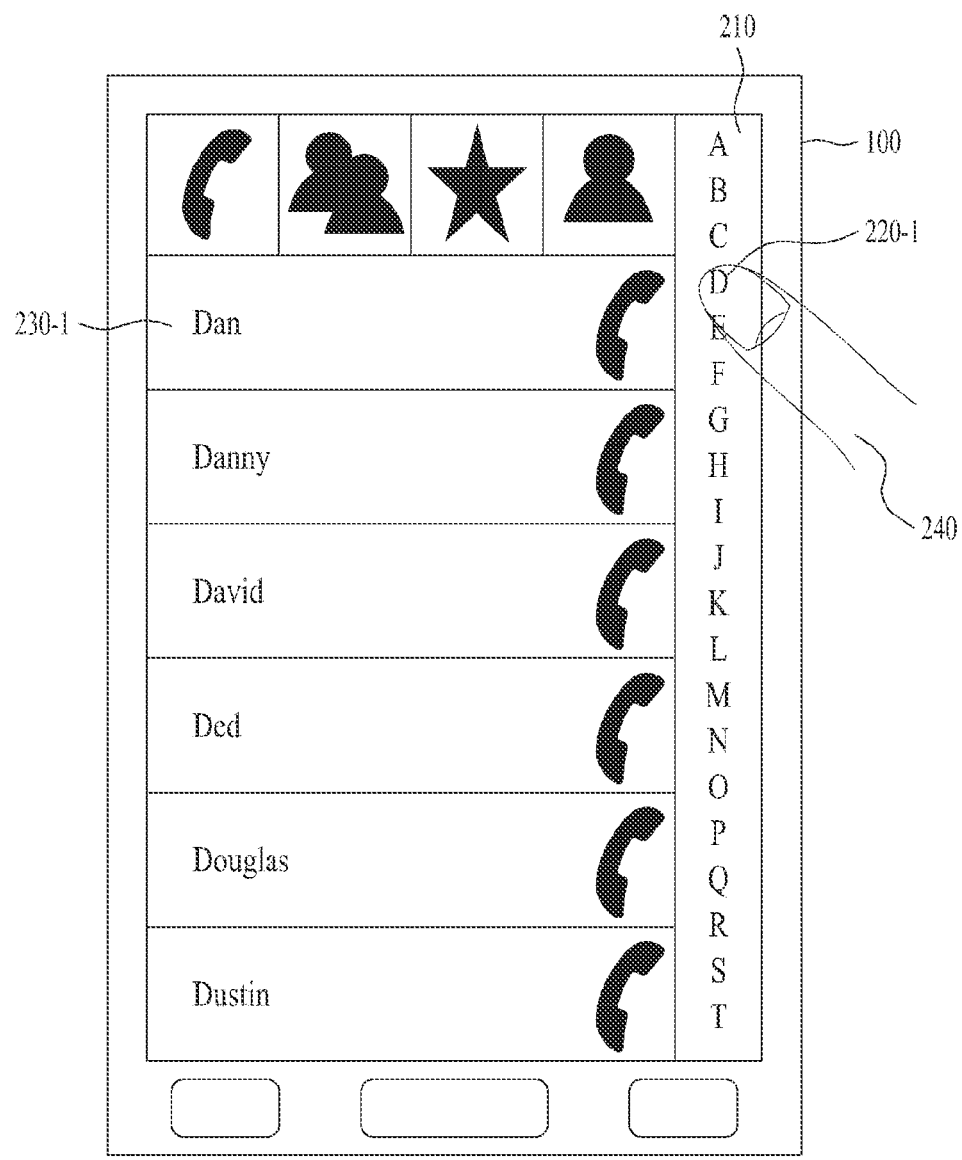
FIGS. 2a and 2b are diagrams illustrating a method for allowing a digital device to display a first interface in accordance with one embodiment of the present specification.
Figure 2B:
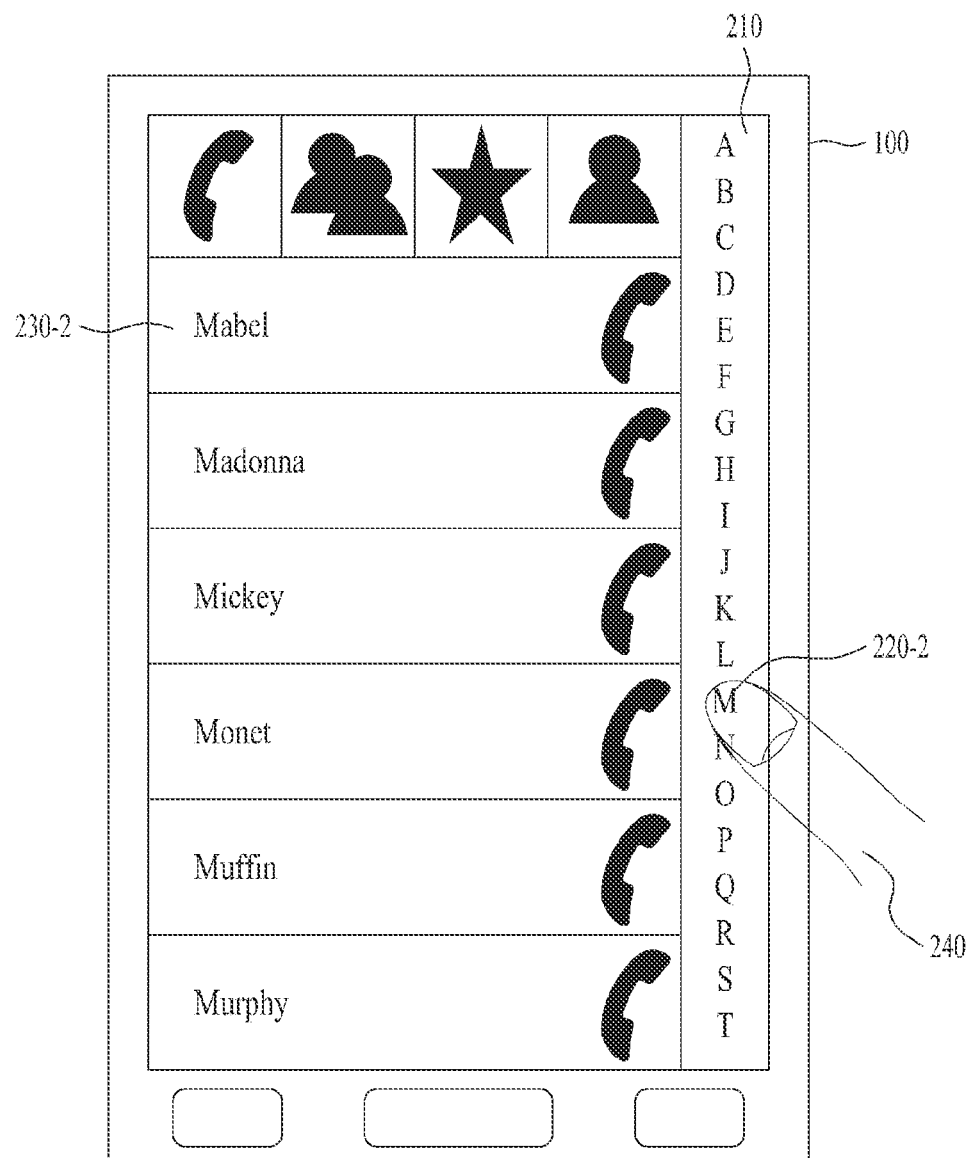

FIGS. 2a and 2b are diagrams illustrating a method for allowing a digital device to display a first interface in accordance with one embodiment of the present specification. The digital device 100 may display a plurality of contents. At this time, the plurality of contents may not be displayed on one screen of the digital device 100. In this case, the digital device 100 may display a first interface 210 that scrolls the plurality of contents. The first interface 210 may detect a control input of a user 240 and scroll the plurality of contents based on the control input of the user.

In more detail, referring to FIGS. 2a and 2b, each of the plurality of contents may be a contact address. For example, a contact address of "Dan" may be one content. At this time, the digital device 100 may detect a control input, which selects a first object 220-1, from the first interface 210. The first object 220-1 may be the object corresponding to a first content 230-1. The digital device 100 may display the first content 230-1 based on the control input for selecting the first object 220-1. Also, for example, the first object 220-1 may be alphabet "D". At this time, the first content 230-1 may be the contact address having the fastest alphabet order among contact addresses starting from alphabet "D". That is, if the digital device 100 selects alphabet "D" which is the first object 220-1, the digital device 100 may display the first content 230-1 having the fastest alphabet order among the contact addresses starting from alphabet "D". Also, if the digital device 100 detects a control input for a second object 220-2, the digital device 100 may display a second content 230-2. At this time, for example, the second object 220-2 may be alphabet "M", and the second content 230-2 may be the contact address having the fastest alphabet order among contact addresses starting from alphabet "M".

Figure 3A:
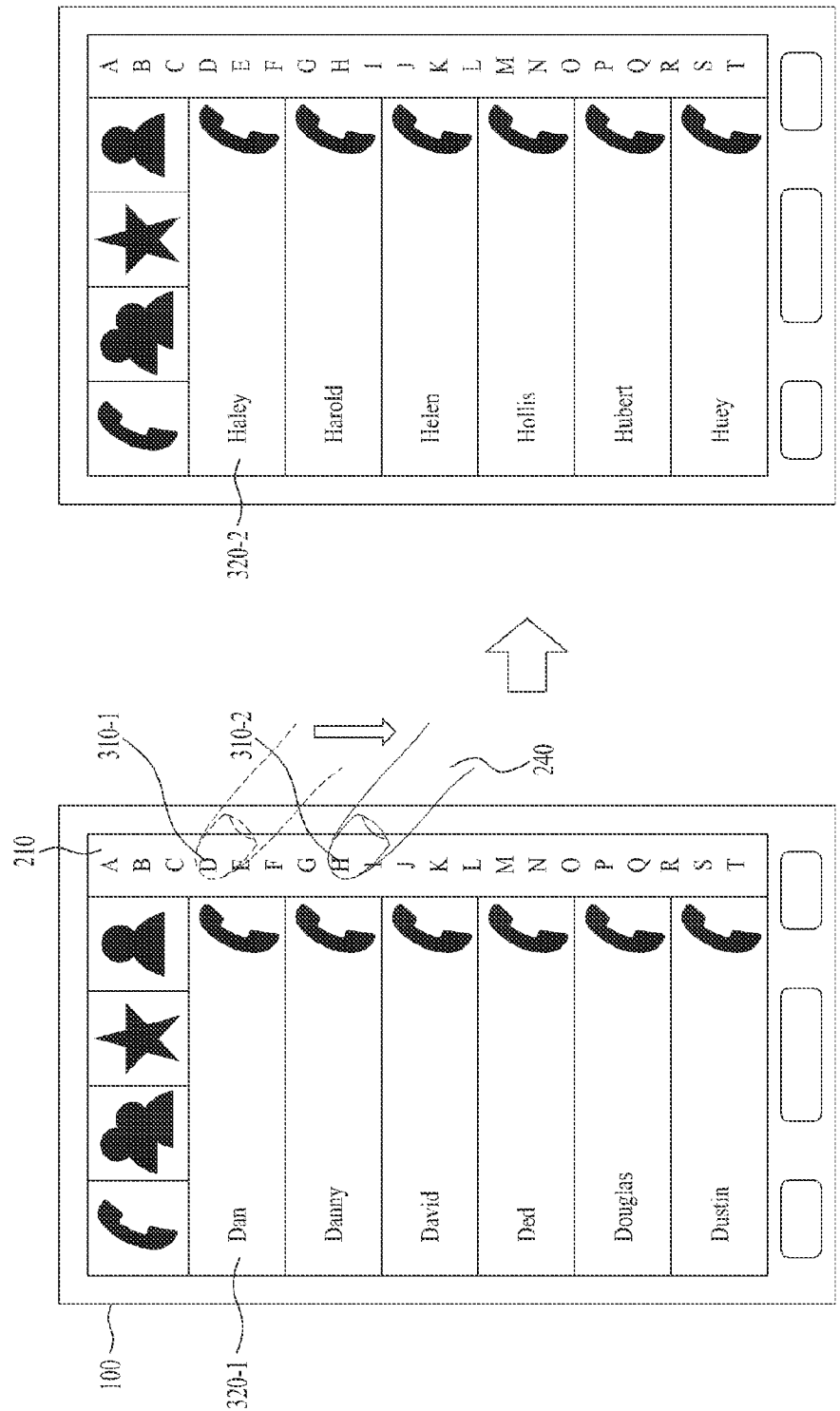
FIGS. 3a and 3b are diagrams illustrating a method for allowing a digital device to control a first interface based on a control input in accordance with one embodiment of the present specification.
Figure 3B:
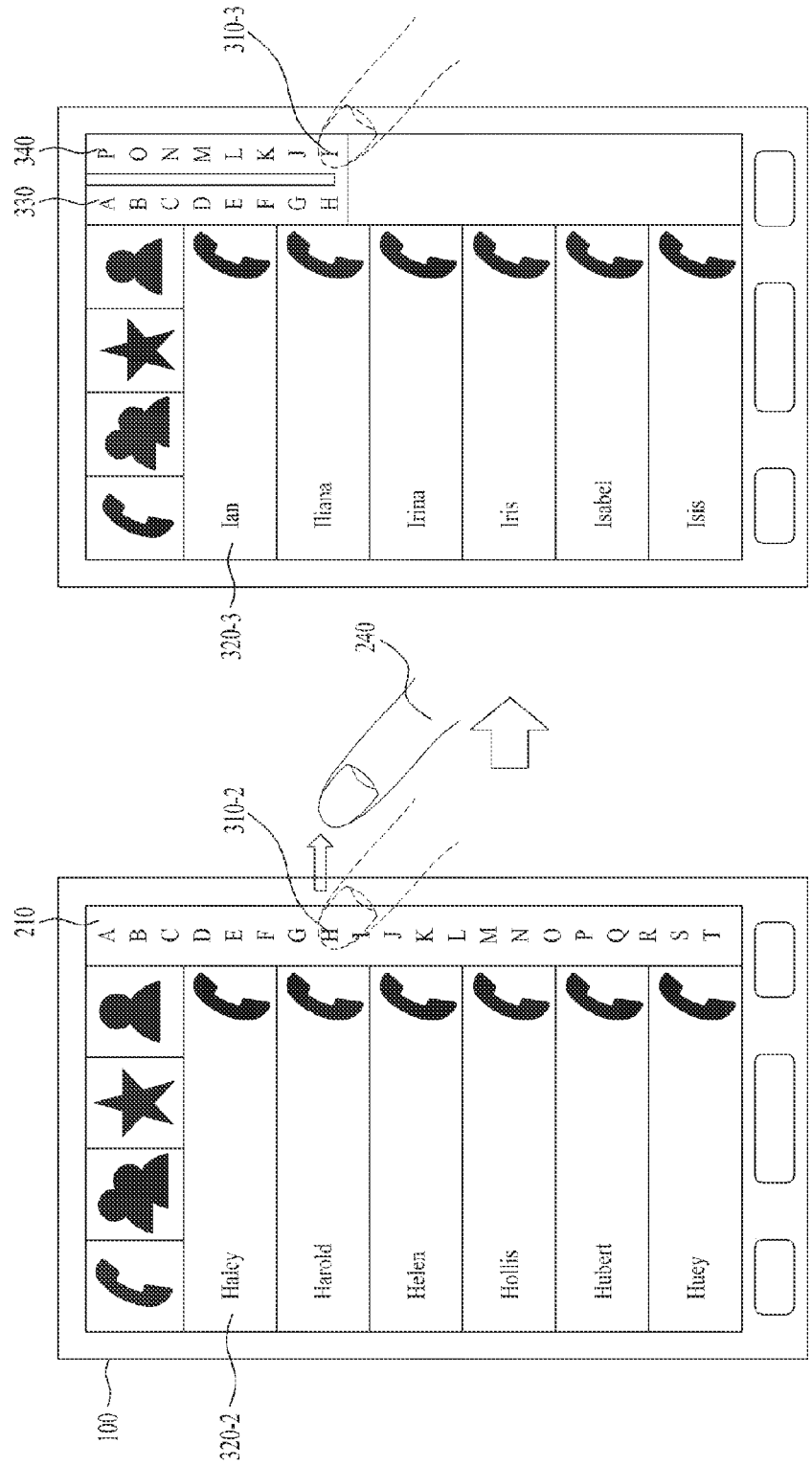

FIGS. 3a and 3b are diagrams illustrating a method for allowing a digital device to control a first interface based on a control input in accordance with one embodiment of the present specification.

Referring to FIG. 3a, the digital device 100 may detect a first slide touch input moving in a first direction within the first interface. At this time, the first direction may be the moving direction within the first interface. For example, the first direction may be the direction moving from a first object 310-1 to a second object 310-2. For another example, the first direction may be the direction moving from the second object 310-2 to the first object 310-1. That is, the first direction may be the direction moving in the first interface 210, and is not limited to the aforementioned examples. If the digital device 100 detects the first slide touch input moving in the first direction, the digital device 100 may scroll a plurality of contents. For example, if the digital device 100 detects the first slide touch input moving from the first object 310-1 to the second object 310-2, the digital device 100 may scroll the plurality of contents from a first content 320-1 to a second content 320-2. Also, for example, the digital device 100 may control a scrolling speed of the plurality of contents based on a speed of the first slide touch input. Also, the digital device 100 may display the first interface 210 in a first shape. The first shape may be the shape of the plurality of objects arranged in the same direction as the displayed order of the plurality of contents. For example, if the plurality of content are displayed in a vertical direction, the first interface 210 may be a rectangular shape in a vertical direction. At this time, the digital device 100 may display the first interface based on a first index order. The first index order may be the order based on attributes of the contents. In more detail, the plurality of objects may be thumbnail images of the plurality of contents. The content property may be displayed based on names of contents, the occurrence order of contents, sizes of contents, etc. At this time, the first index order may be the order set based on the aforementioned content property. For example, if the plurality of content are contact addresses, the digital device 100 may display the plurality of contents based on the alphabet order. At this time, the first interface 210 may include the plurality of objects which may be alphabets. At this time, the first index order may be the alphabet order. That is, the digital device 100 may set the first index order equally to the displayed order of the plurality of contents.

Also, for example, referring to FIG. 3b, the digital device 100 may detect a second slide touch input moving in a second direction. At this time, the second direction may be the moving direction from the inside of the first interface 210 to the outside of the first interface 210, and is not limited to the aforementioned example. If the digital device 100 detects the second slide touch input moving in the second direction, the digital device 100 may display the first interface 210 in a second shape. The second shape may be the shape of some of the plurality of objects included in the first interface 210, wherein some of the plurality of objects is moved aside and displayed. In more detail, if the user controls the first interface 210 indicating index information with his/her one hand, the user may have a difficulty in controlling the first interface 210 in accordance with a size of the display unit 110 and his/her hand size. That is, there may be limitation in a position where the first slide touch input performed by the user reaches. At this time, the user may display the first interface 210 in the second shape in accordance with the second slide touch input moving in the second direction. As a result, the user may easily control the first interface 210 even with one hand. For example, the digital device 100 may display the first interface 210 in a shape "U" at the position where the second slide touch input is detected. That is, the digital device 100 may display some of the plurality of objects included in the first interface 210 in a shape that some of the plurality of objects is moved aside. For example, the plurality of contents may be the contact addresses displayed based on the alphabet order. At this time, the digital device 100 may detect the second slide touch input from alphabet "H" of the first interface 210. The digital device 100 may display alphabet "I" which is next to alphabet "H" in a shape that "I" is moved aside. For another example, if the digital device 100 displays the first interface 210 in the second shape, the digital device 100 may display the plurality of objects based on the second index order. At this time, for example, if the first interface 210 is displayed in the second shape, the first interface may be divided into a first part 330 and a second part 340. In this case, the digital device 100 may display the plurality of objects included in the first part 330 based on a first sequence. The first sequence may be the existing alphabet order. Also, the digital device 100 may display the plurality of objects included in the second part 340 based on a second sequence. The second sequence may be the inverse order of the alphabet order. Alphabets may be arranged in the second part 340 in a direction different from that of the plurality of displayed contents. That is, the second index order may be the order that displays the first part 330 and the second part 340 in the second shape based on different sequences.

At this time, for example, the second index order may be a continuous order in view of the first interface 210. In more detail, if the first interface 210 is displayed in the second shape, the plurality of objects may be displayed in the same index order within the first interface 210. As a result, the user may scroll the plurality of contents in accordance with the control input moving within the first interface 210. Also, the second index order may be the order of a changed direction in view of the displayed order of the plurality of contents. In more detail, if the first interface 210 is displayed in the second shape, the digital device 100 may set a moving direction of the control input for the plurality of objects in the second part 340 differently from a scrolling direction of the plurality of contents.

Figure 4B:
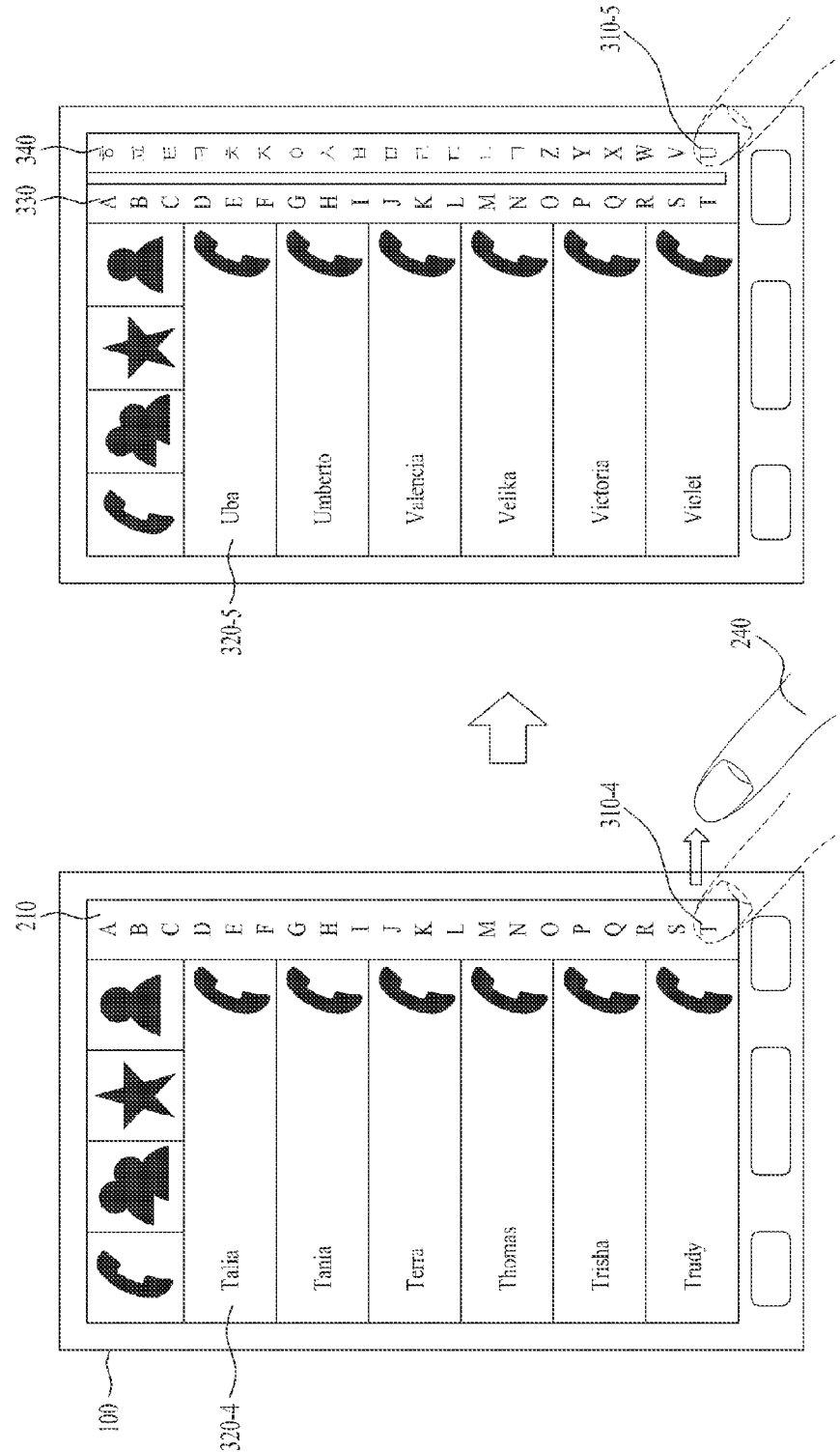

FIGS. 4a and 4b are diagrams illustrating a method for allowing a digital device to control a shape of a first interface based on a position where a control input is detected in accordance with one embodiment of the present specification. The digital device 100 may display a second shape of a first interface 210 differently based on a position of a slide touch input in a second direction. In more detail, the digital device 100 may detect a slide touch input moving from a first position within the first interface 210 to the outside of the first interface 210. At this time, the digital device 100 may change the shape of the first interface 210 at the first position. In this case, the digital device 100 may display the first interface 210 by dividing the first interface 210 into a first part 330 and a second part 340 based on the first position. Also, the digital device 100 may detect the slide touch input moving from a second position within the first interface 210 to the outside of the first interface 210. At this time, the digital device 100 may change the shape of the first interface 210 at the second position. In this case, the digital device 100 may display the first interface 210 by dividing the first interface 210 into the first part 330 and the second part 340 based on the second position.

For example, referring to FIG. 4a, the plurality of contents may be the contact addresses displayed in the alphabet order. Also, the first interface may include alphabets as the plurality of objects. At this time, the digital device 100 may detect the slide touch input moving from the first position to the second direction. For example, the first position may be the position corresponding to alphabet "H". At this time, the digital device 100 may display the first interface 210 in the second shape. The second shape may be the shape of the first part 330 and the second part 340, which are divided based on "H". At this time, the digital device 100 may display the plurality of objects in the first part 330 based on a first sequence order which is the alphabet order. Also, the digital device 100 may display the plurality of objects in the second part 340 based on a second sequence order which is the reverse order of the alphabet order.

Also, for example, referring to FIG. 4b, the digital device 100 may detect a slide touch input moving from the second position to the second direction. At this time, for example, the second position may be the position corresponding to alphabet "T". At this time, the digital device 100 may display the first interface 210 in the second shape. In this case, the second shape may be the shape of the first part 330 and the second part 340, which are divided based on "T". At this time, the digital device 100 may display the plurality of objects in the first part 330 based on the first sequence order which is the alphabet order. Also, the digital device 100 may display the plurality of objects in the second part 340 based on the second sequence order which is the reverse order of the alphabet order. In this case, for example, alphabet and Korean consonants may be displayed in the second part 340 as the plurality of objects. That is, the plurality of objects may include different languages to correspond to the plurality of contents. The digital device 100 may display Korean consonants sequentially as next order of the alphabet order. At this time, the digital device 100 may display Korean consonants in the reverse order as the second sequence.

Figure 5A:
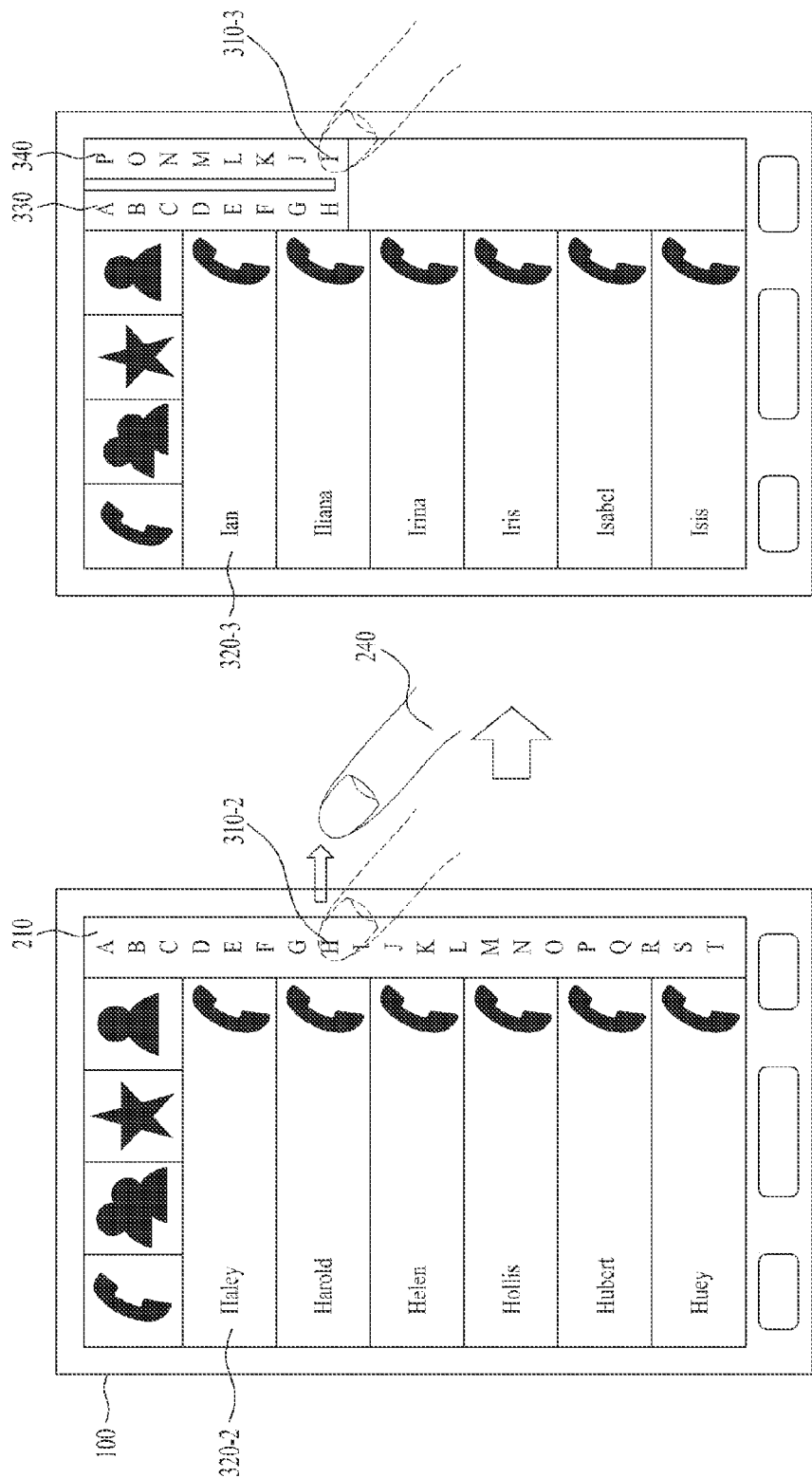

FIGS. 5a and 5b are diagrams illustrating a method for allowing a digital device to display a plurality of objects in a first interface in accordance with one embodiment of the present specification. If the digital device 100 displays a first interface 210 in a second shape, the digital device 100 may control a display method of a plurality of objects included in the first interface 210.

In more detail, referring to FIG. 5a, if the digital device 100 displays the first interface 210 in a first shape, the digital device 100 may display the plurality of objects in accordance with a size of the display unit 110. For example, the plurality of objects may be alphabets. In this case, the digital device 100 may display alphabets from "A" to "T" by considering the size of the display unit 110. The digital device 100 may detect a slide touch input moving in a second direction from a first object 310-2. At this time, the digital device 100 may display the first interface 210 in the second shape. For example, the digital device 100 may display the plurality of objects based on the first position of the first object 310. For example, the digital device 100 may display alphabets from "A" to "H" in the first part 330 in the same manner as the existing manner. Also, the digital device 100 may display alphabets from "I" to "P" in the second part 340 by considering the size of the second part 340. In other words, the digital device 100 may display the plurality of objects included in the first interface 210 by considering the size of the second part 340.

For another example, referring to FIG. 5b, if the digital device 100 displays the first interface 210 in the second shape, the digital device 100 may display all of the plurality of objects displayed in the first shape. In more detail, the digital device 100 may display alphabets from "A" to "T". The digital device 100 may detect that the first interface 210 is changed to the second shape. At this time, the digital device 100 may display alphabets from "A" to "T" in the first part 330. At this time, the digital device 100 may display alphabets from "A" to "H" in the first part 330 of the first interface 210. Also, the digital device 100 may display alphabets from "I" to "T" in the second part 340 of the first interface 210. That is, the digital device 100 may equally set the number of the plurality of objects which are displayed, even if the shape of the first interface 210 is changed.

Figure 6A:
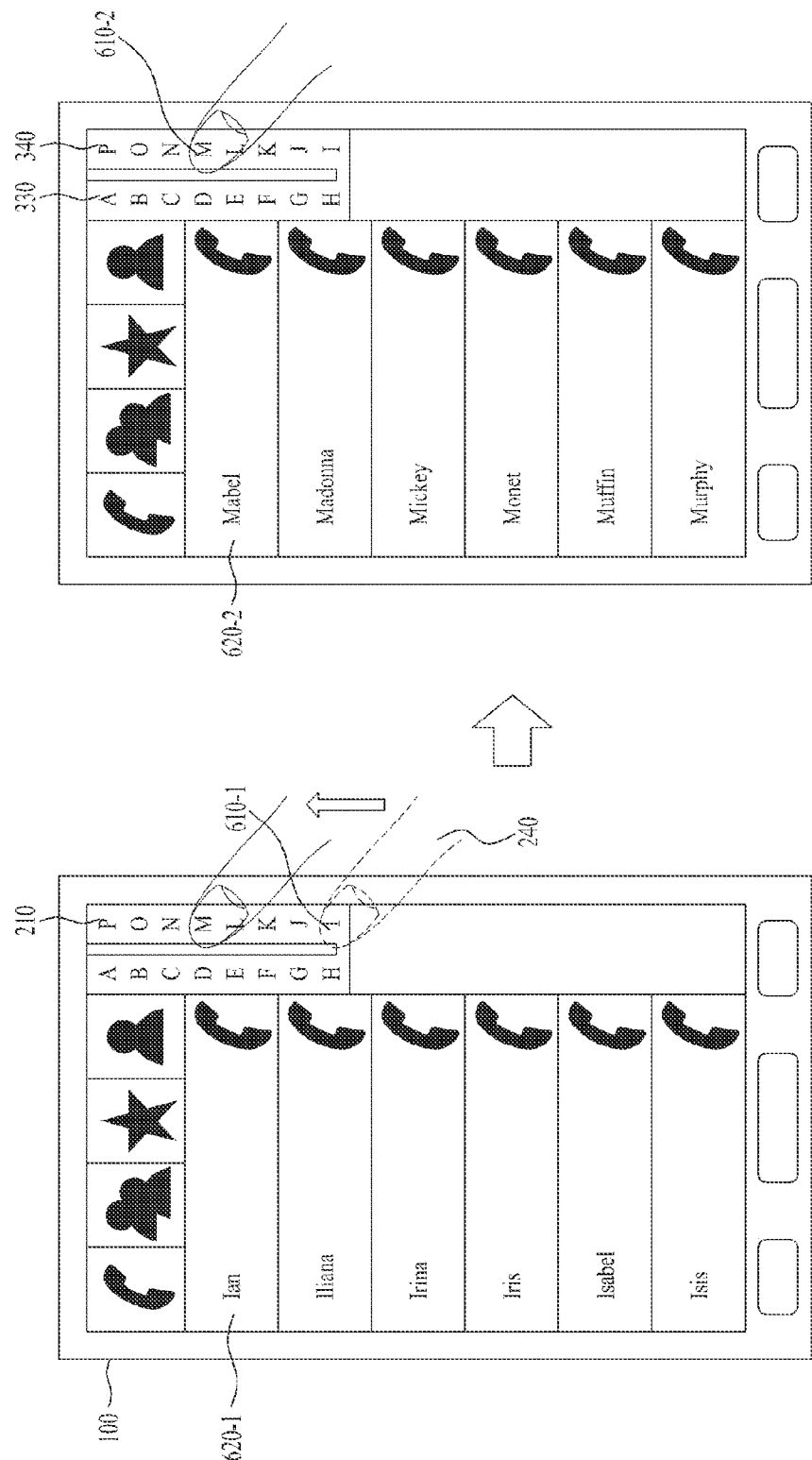
FIGS. 6a and 6b are diagrams illustrating a method for allowing a digital device to control a first interface based on a control input in accordance with one embodiment of the present specification.
Figure 6B:
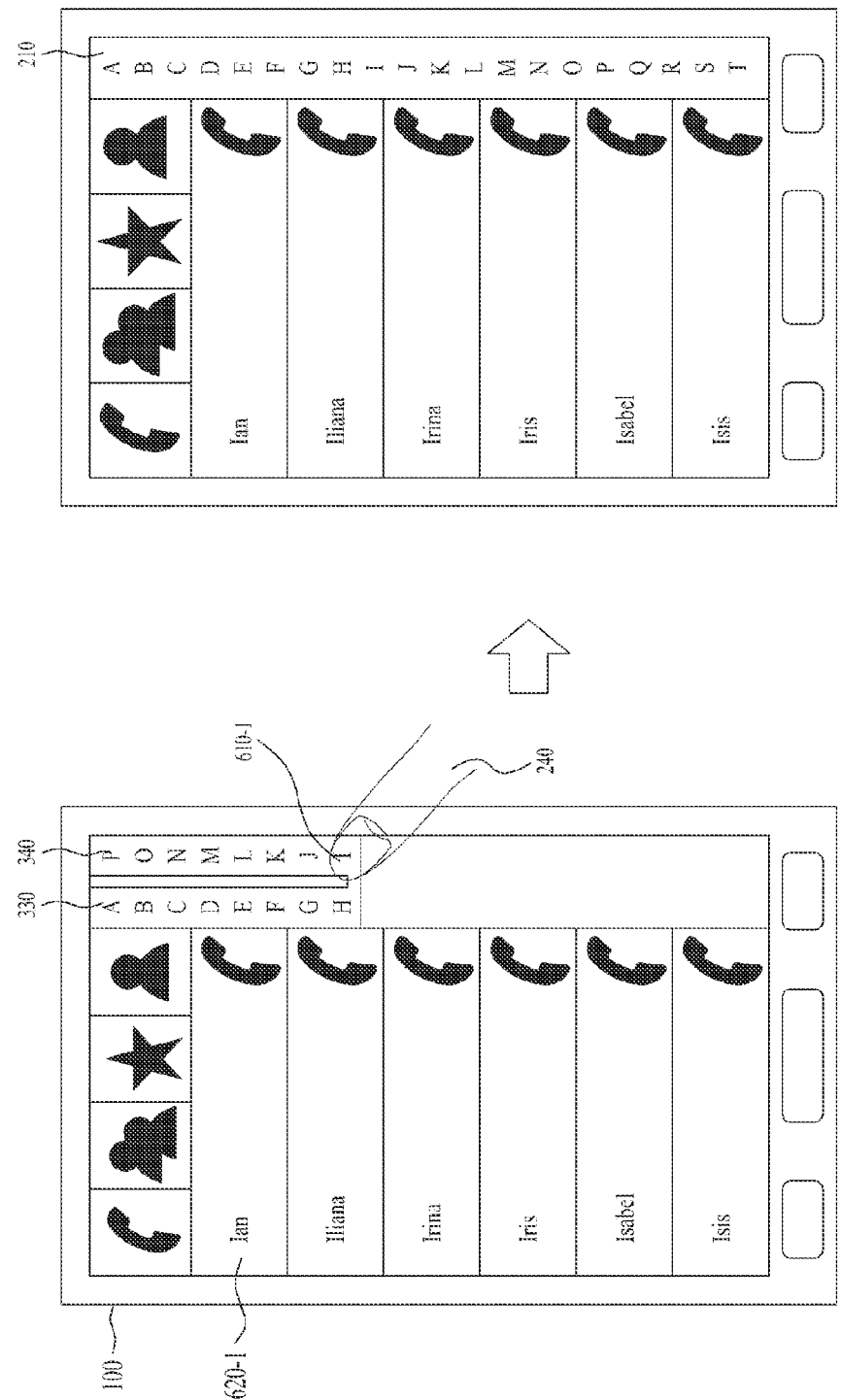

FIGS. 6a and 6b are diagrams illustrating a method for allowing a digital device to control a first interface based on a control input in accordance with one embodiment of the present specification. The digital device 100 may display a first interface 210 in a second shape based on a slide touch input moving in a second direction. At this time, the digital device 100 may detect that the slide touch input is moved in a state that the slide touch input is not released. In more detail, the digital device may detect that the slide touch input is located in a first object 610-1 within the first interface 210 in a state that the slide touch input is not released. At this time, the state that the slide touch input is not released may mean the state that the touch is continuously maintained in the display unit 110. In this case, the digital device 100 may display a first content 620-1 corresponding to the first object 610-1. Afterwards, the digital device 100 may detect that a second slide touch input is moved to a second object 610-2 within the first interface 210 in a state that the second slide touch input is not released. In other words, the digital device 100 may detect that the slide touch input is moved to the second object 610-2 in a state that the slide touch input is maintained. At this time, the digital device 100 may display a second content 620-2 corresponding to the second object 610-2. For example, the digital device 100 may detect that the slide touch input is moved to from the first object 610-1 to the second object 610-2 in a state that the slide touch input is not released. At this time, the direction of the slide touch input may be an upward direction. Also, the digital device 100 may scroll a plurality of contents. In this case, the scrolling direction of the plurality of contents may be a downward direction. That is, the digital device 100 may scroll the plurality of contents in a direction opposite to the moving direction of the slide touch input. As a result, if the user controls the digital device 100 with his/her one hand, the user may control the first interface 210 in a state that the user does not move his/her hand, and may scroll the plurality of contents.

For another example, if the digital device 100 displays the first interface 210 in a second shape, the digital device 100 may detect that the slide touch input is released. That is, the digital device 100 may detect that the slide touch input is changed in a state that the slide touch input is spaced apart from the display unit 110. At this time, the digital device 100 may display the first interface in a first shape. That is, the digital device 100 may change the display shape of the first interface 210 only in a state that the slide touch input is maintained.

FIG. 7 is a diagram illustrating a method for allowing a digital device to control a first interface based on a control input in accordance with one embodiment of the present specification. If the digital device 100 displays the first interface 210 in a second shape, the digital device 100 may detect a slide touch input moving from a second position within the first interface 210 to a third direction. At this time, the third direction may be a direction moving from the inside of the first interface 210 to the outside of the first interface 210. The digital device 100 may display the first interface 210 in a third shape.

In more detail, referring to FIG. 7, the digital device 100 may display the first interface 210 in the second shape. At this time, if the digital device 100 detects that a slide touch input is moving from the inside of the first interface 210 to a first object 710-1, the digital device 100 may display a first content 720-1 corresponding to the first object 710-1. That is, the digital device 100 may scroll a plurality of contents in accordance with the touch input moving within the first interface 210. At this time, the digital device 100 may detect the slide touch input moving from the position where the first object 710-1 is displayed, to a third direction. For example, the third direction may be a direction from the inside of the first interface 210 to the outside of the first interface 210. At this time, the digital device 100 may display the first interface 210 in a third shape. For example, the digital device 100 may set the third shape differently based on the third direction. That is, the digital device 100 may change the shape of the first interface 210 along the movement of the third direction. Also, the digital device 100 may set the third shape differently based on the position where the slide touch input moving in the third direction is detected. That is, the digital device 100 may change the shape of the first interface 210 at the position where the slide touch input is detected. At this time, the first interface 210 may include a first part, a second part, and a third part. The digital device 100 may display a plurality of objects in the first part based on a first sequence. Also, the digital device 100 may display the plurality of objects in the second part based on a second sequence. Also, the digital device 100 may display the plurality of objects in the third part based on a third sequence. For example, the plurality of objects may be displayed in a continuous order based on the first interface 210. Also, the plurality of objects may be displayed in each of the first part, the second part and the third part in each order based on the plurality of contents, as described above.

FIG. 8 is a diagram illustrating a method for allowing a digital device to control a first interface based on a control input in accordance with one embodiment of the present specification. The digital device 100 may display the first interface 210 in a second shape. In this case, the digital device 100 may detect a slide touch input moving from a first position where a first object 810-1 is displayed to a second position where a second object 810-2 is displayed. At this time, the first object 810-1 may be the object located in a second part 340. Also, the second object 810-2 may be the object located in a first part 330. For example, the digital device 100 may display the first interface 210 in a first shape. At this time, the digital device 100 may set the second position to a position corresponding to the first object 810-2. Also, the digital device 100 may display a plurality of objects in accordance with a first index order based on the second position of the first object 810-2.

In more detail, referring to FIG. 8, the digital device 100 may detect the slide touch input moving from the first position where the first object 810-1 is displayed to the second position where the second object 810-2 is displayed. At this time, the first object 810-1 may be alphabet "M". Also, the second object 810-2 may be alphabet "D". At this time, the digital device 100 may move the alphabet "M" to the position of the alphabet "D". Also, the digital device 100 may display the first interface 210 in accordance with the alphabet order based on the alphabet "M". That is, the digital device 100 may display the first interface 210 by changing the first index order from the first interface 210. As a result, the user may display a desired object in the first interface 210.

Figure 9A:
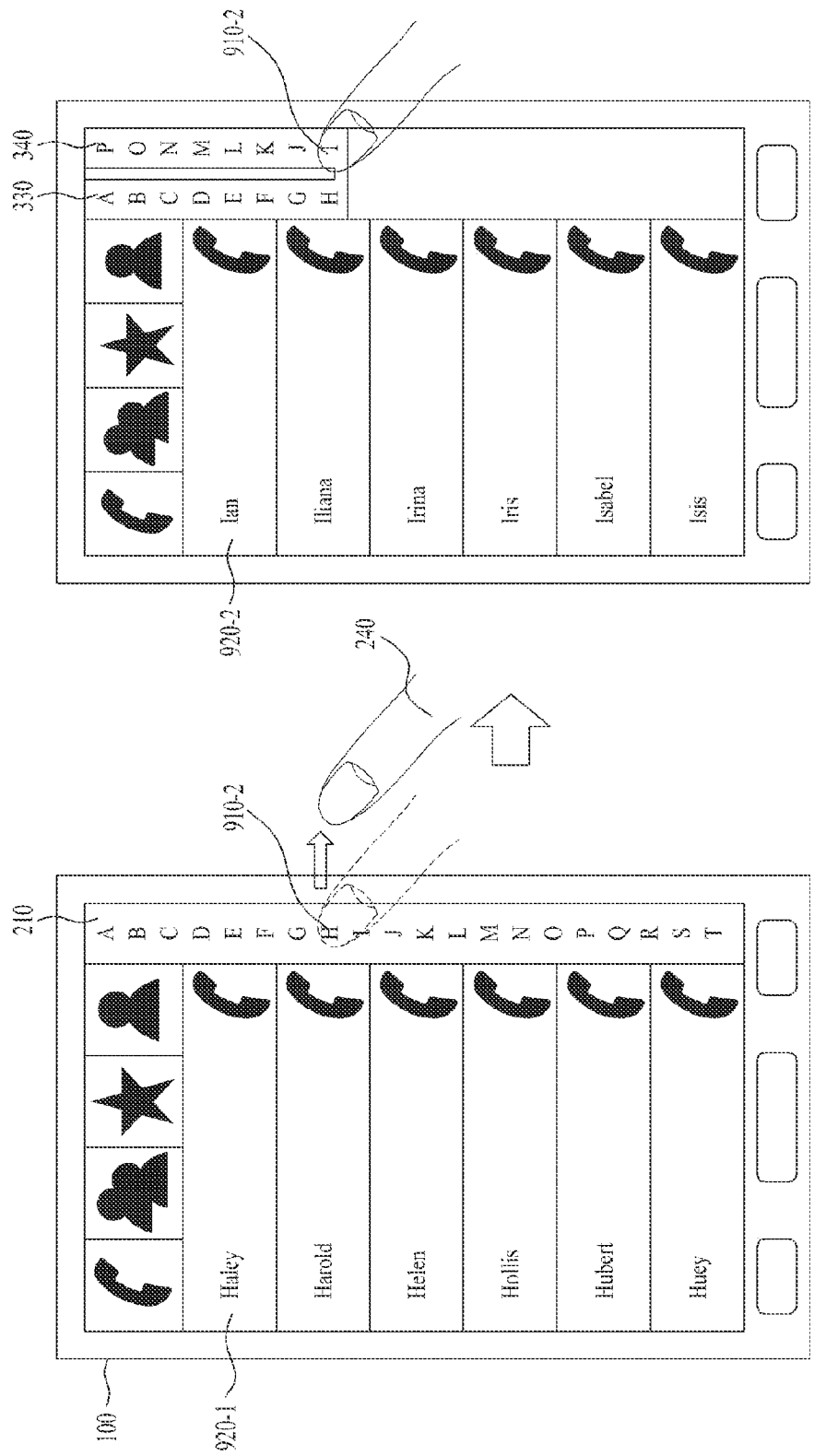

FIGS. 9a and 9b are diagrams illustrating a method for allowing a digital device to display a shape of a first interface differently based on a direction of a slide touch input in accordance with one embodiment of the present specification. The digital device 100 may display the first interface 210 differently based on a second direction of a slide touch input. At this time, for example, the digital device 100 may detect the slide touch input moving in a left direction as the second direction. In this case, the digital device 100 may display the first interface 210 in a shape curved towards a left side. Also, for example, the digital device 100 may detect the slide touch input moving in a right direction as the second direction. In this case, the digital device 100 may display the first interface 210 in a shape curved towards a right side.

For another example, the digital device 100 may display the first interface 210 by changing the shape of the first interface 210 along the moving direction of the slide touch input. For example, the digital device 100 may detect that the slide touch input is moved in a diagonal direction as an intermediate direction of a downward direction and an upward direction. At this time, the digital device 100 may change the first interface 210 in a diagonal direction. That is, the digital device 100 may change the shape of the first interface along the moving direction of the slide touch input, and is not limited to the aforementioned example.

Figure 10:
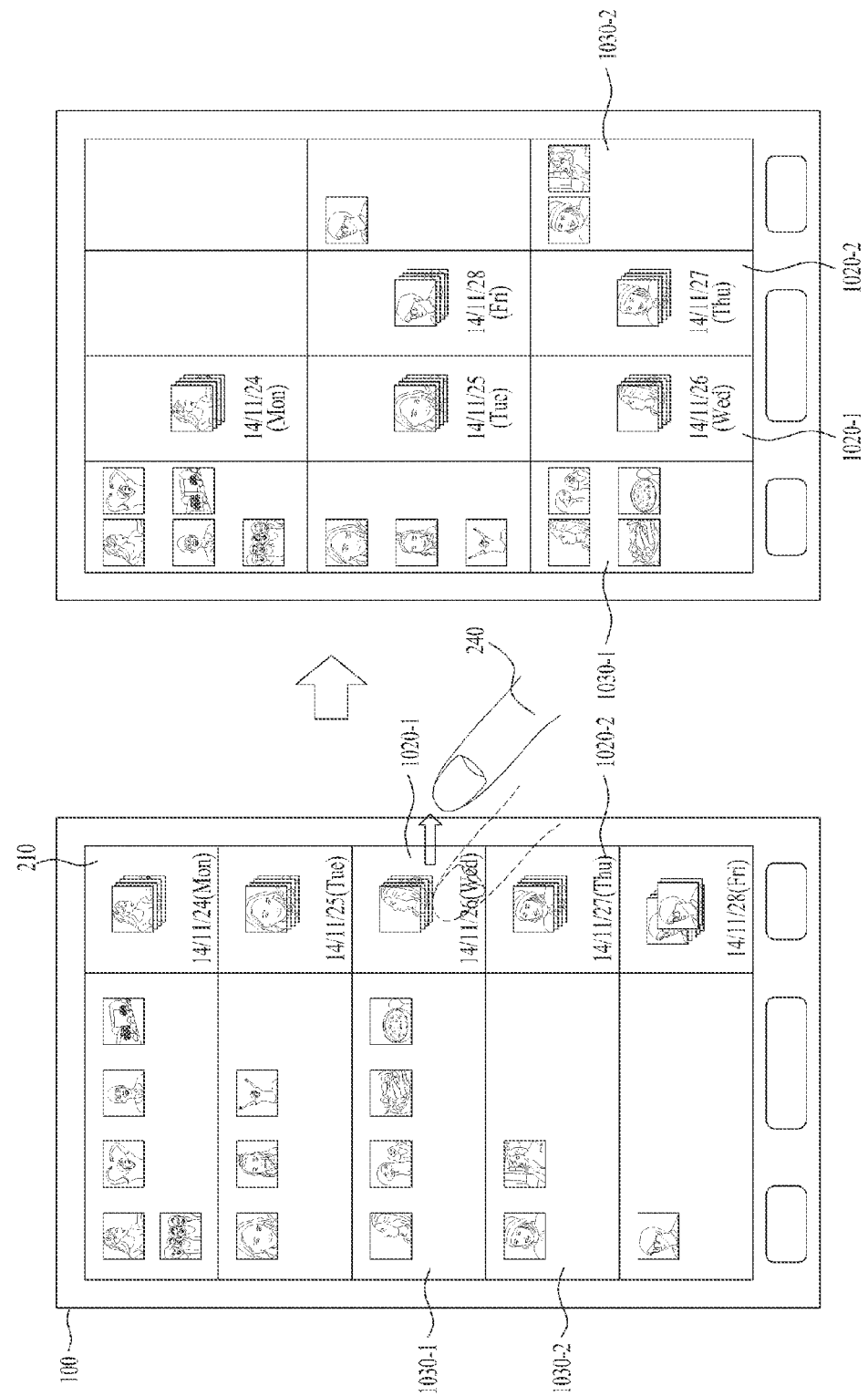
FIG. 10 is a diagram illustrating a method for allowing a digital device to display a first interface based on content property in accordance with one embodiment of the present specification.

FIG. 10 is a diagram illustrating a method for allowing a digital device to display a first interface based on content property in accordance with one embodiment of the present specification. For example, a plurality of objects may be thumbnail images of a plurality of contents. The digital device 100 may set a first index order of the first interface 210 based on content property. At this time, the content attributes may include at least one of the occurrence order of contents, names of contents, sizes of contents, and shapes of contents. That is, the first interface 210 may display the plurality of objects related to the contents based on the contents.

For example, referring to FIG. 10, the plurality of contents may be images. Also, for example, one content may be a group that includes a plurality of images having the same attributes. At this time, the same attributes may be image occurrence date, image shape, image size, etc. The first interface 210 may display the plurality of objects corresponding to the contents. In more detail, a first content 1030-1 may be an image group taken on Nov. 26, 2014. At this time, a first object 1020-1 corresponding to the first content 1030-1 may be information based on the date when the image is taken. That is, the digital device 100 may display the plurality of contents and the first interface 210 corresponding to the contents. At this time, for example, the digital device 100 may detect a slide touch input moving from the inside of the first interface 210 to the outside of the first interface 210. Also, the digital device 100 may display the first interface 210 in a second shape. At this time, the second shape may be the shape changed based on the position where the slide touch input is detected. Also, for example, the digital device 100 may change the display shape of the contents. In more detail, the digital device 100 may change the display shape of the contents based on the changed shape of the first interface 210. At this time, the digital device 100 may display the first content 1030-1 next to the first object 1020-1 located in the first part. Also, the digital device 100 may display a second content 1030-1 next to a second object 1020-2 located in the second part. That is, the digital device 100 may change the shape of the first interface 210 and the display shape of the contents based on the slide touch input moving in a second direction.

Figure 11:
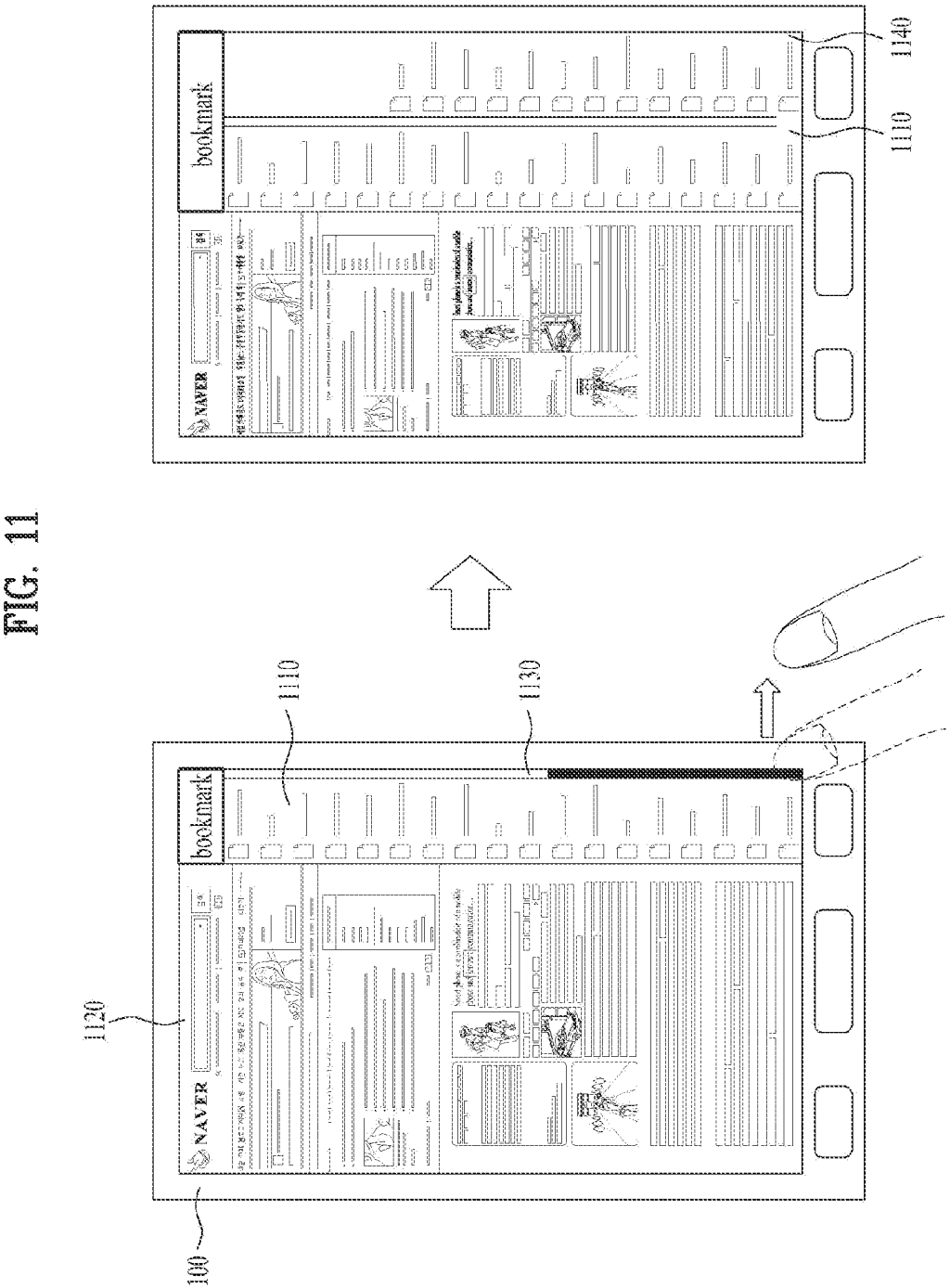
FIG. 11 is a diagram illustrating a method for allowing a digital device to display a first interface based on content property in accordance with one embodiment of the present specification.

FIG. 11 is a diagram illustrating a method for allowing a digital device to display a first interface based on content property in accordance with one embodiment of the present specification. A first interface 1130 may not include a plurality of objects. In more detail, the first interface 1130 may be a scroll bar. That is, the digital device 100 may scroll a plurality of contents based on a control input within the first interface 1130 which is a scroll bar. At this time, for example, the digital device 100 may scroll the plurality of contents based on the control input moving within the first interface 1130. Also, for example, the digital device 100 may enlarge a display area of the contents if the control input moving from the inside of the first interface 1130 to the outside of the first interface 1130 is detected.

In more detail, referring to FIG. 11, the digital device 100 may display the plurality of contents in a first display area 1110. At this time, the digital device 100 may detect the slide touch input moving from the inside of the first interface 1130 to the outside of the first interface 1130. The digital device 100 may further display the plurality of contents in the first display area 1110 and a second display area 1140. That is, the digital device 100 may further display the contents, which are not displayed before, in the second display area 1140. As a result, the user may identify the plurality of contents even without scrolling the first interface 1130. For example, the digital device 100 may implement a web browser application 1120 and a bookmark menu of the web browser application 1120. At this time, the contents may be web addresses registered in the bookmark, and may be displayed in the first display area 1110. At this time, the digital device 100 may not display all the contents on one screen if there are many contents which are previously stored. At this time, the digital device 100 may display the first interface 1130 which is a scroll bar. The digital device 100 may scroll the plurality of contents by using the first interface 1130. For example, the digital device 100 may detect the slide touch input moving from the inside of the first interface 1130 to the outside of the first interface 1130. At this time, the digital device 100 may display the plurality of contents in the first display area 1110 and the second display area 1140. The digital device 100 may display the plurality of contents, which are displayed by scrolling, in the second display area 1140. That is, the digital device 100 may further display the plurality of contents even without scrolling the first interface 1130.

Figure 12:
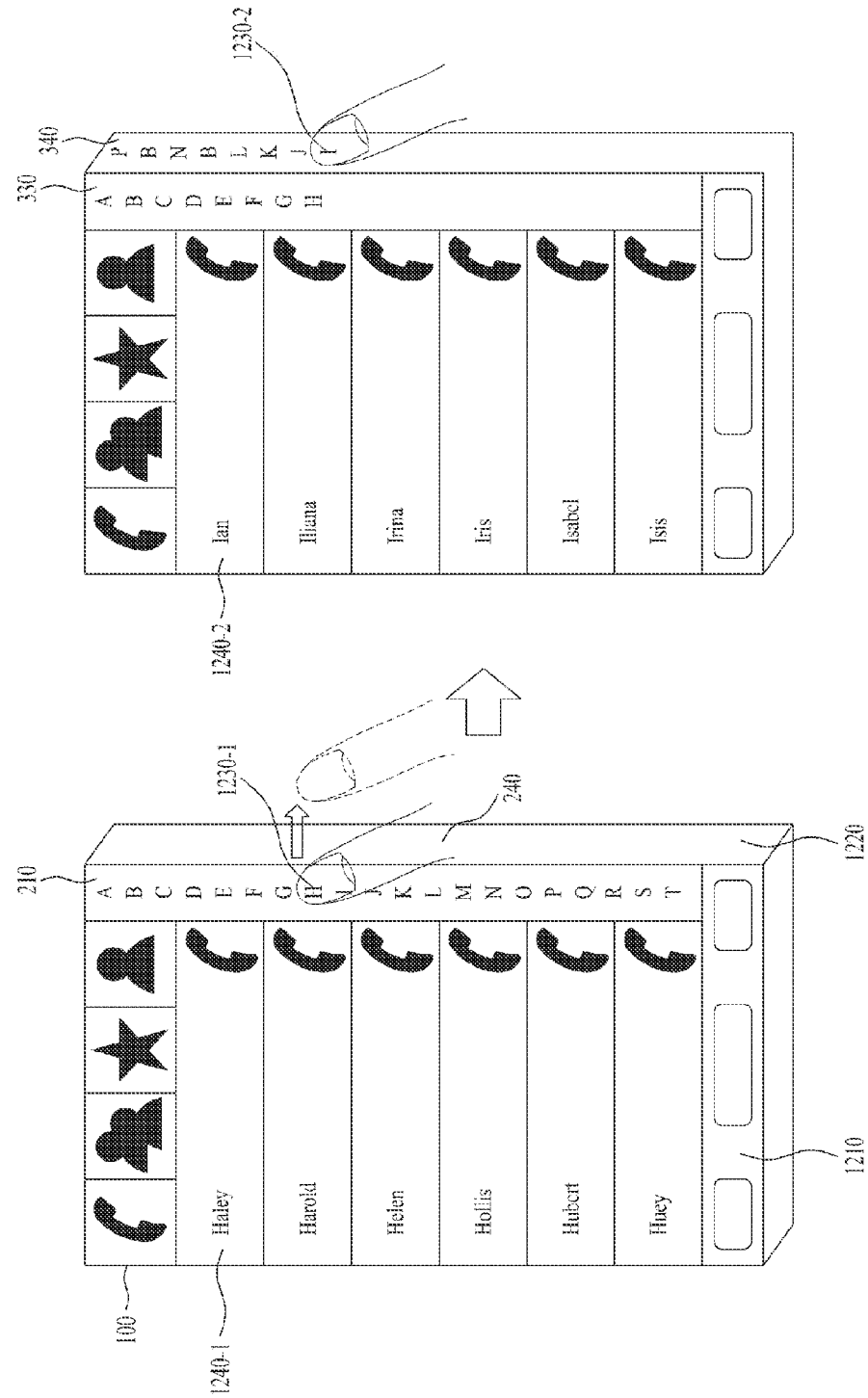
FIG. 12 is a diagram illustrating a method for allowing a digital device to display a first interface on a front region and a side region in accordance with one embodiment of the present specification.

FIG. 12 is a diagram illustrating a method for allowing a digital device to display a first interface on a front region and a side region in accordance with one embodiment of the present specification. The digital device 100 may display visual information on a first display area 1210 and a second display area 1220. At this time, the first display area 1210 may be a front region of the digital device 100. Also, the second display area 1220 may be a side region of the digital device 100. For example, the first display area 1210 and the second display area 1220 may be the areas identified from each other by at least one edge. At this time, the digital device 100 may display the first interface 210 on the first display area 1210. The first interface 210 may be displayed in a first shape. If the digital device 100 detects a slide touch input moving from the inside of the first interface 210 to the outside of the first interface 210, the digital device 100 may display the first interface 210 in a second shape. In this case, the first interface 210 may include a first part 330 and a second part 340. For example, the digital device 100 may display the first part 330 on the first display area 1210. Also, the digital device 100 may display the second part 340 on the second display area 1220. That is, the digital device 100 may partially display the first interface 210 changed based on the slide touch input, on the second display area 1220. As a result, the user may use the side region as the display area and a control area.

Figure 13A:
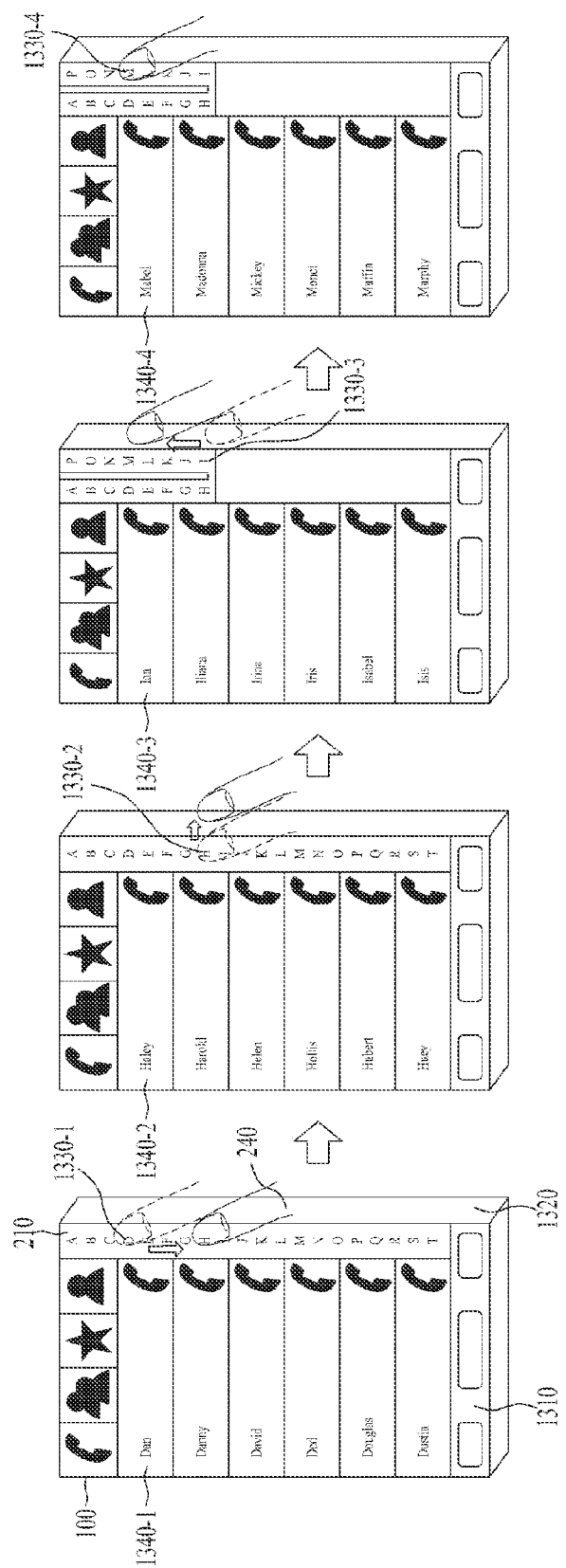
FIGS. 13a and 13b are diagrams illustrating a method for allowing a digital device to control a first interface on a front region and a side region in accordance with one embodiment of the present specification.
Figure 13B:
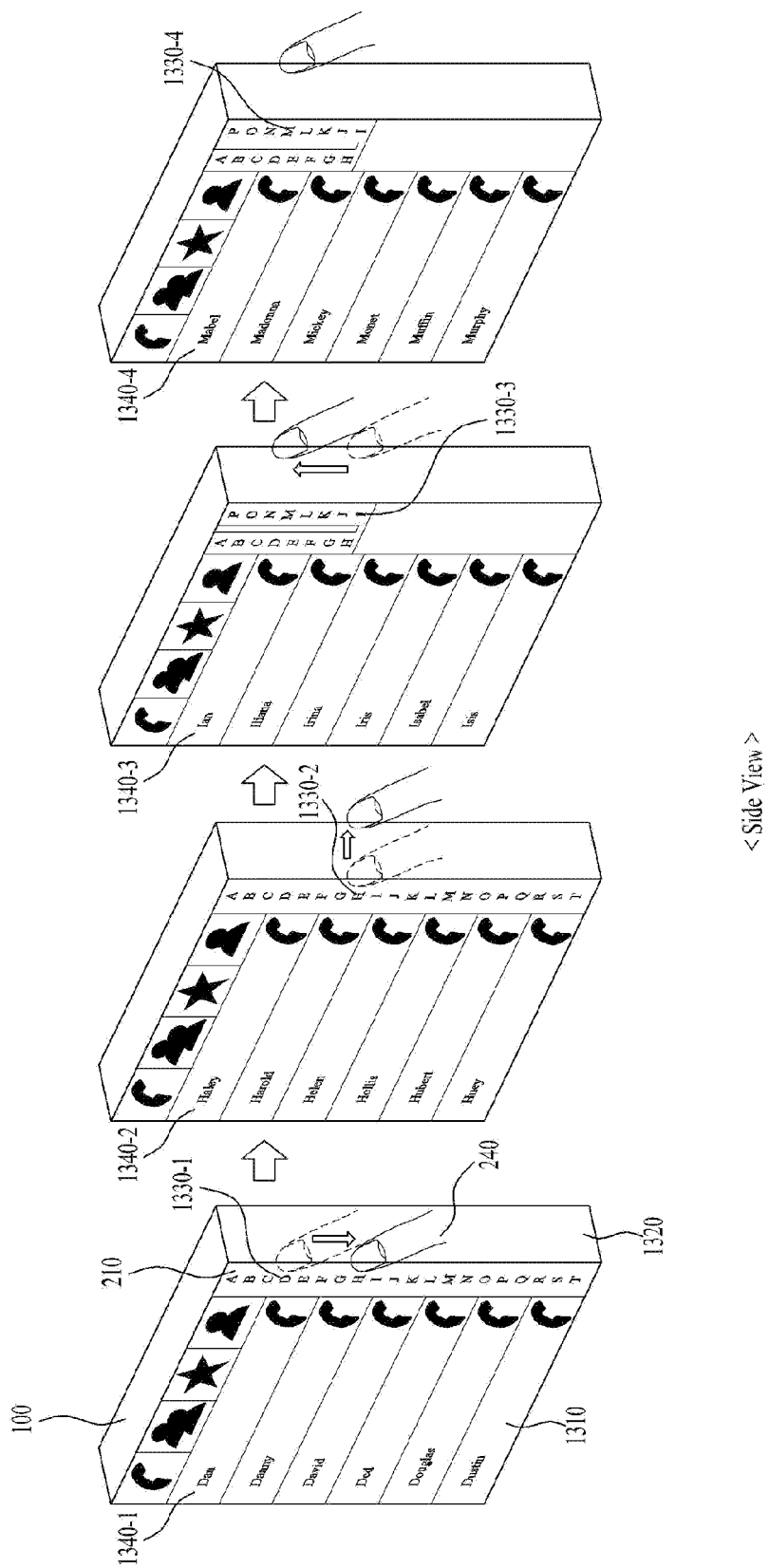

FIGS. 13a and 13b are diagrams illustrating a method for allowing a digital device to control a first interface on a front region and a side region in accordance with one embodiment of the present specification. The digital device 100 may provide visual information to a front region 1310. Also, the digital device 100 may detect a control input, which controls the visual information, from a side region 1320.

In more detail, referring to FIGS. 13*a* and 13*b*, the digital device 100 may display the first interface 210 on the front region 1310 in a first shape. At this time, the digital device 100 may control the first interface 210 in accordance with a touch input for touching the side region 1320. For example, the digital device 100 may detect a touch input for touching a first position, from the side region 1320. At this time, the first position may be the position corresponding to a first object 1330-1 of the first interface 210. For example, the first position may be an edge part which is a boundary between the front region 1310 and the side region 1320. At this time, the digital device 100 may display a first content 1340-1 corresponding to the first object 1330-1. Also, the digital device 100 may detect a slide touch input moving from the first position to the second position. For example, the second position may be an edge which is a boundary between a rear area (not shown) of the digital device 100 and the side region 1320. That is, the digital device 100 may detect the slide touch input moving within the side region 1320. At this time, the digital device 100 may display the first interface 210 on the first display area 1310 in a second shape. The digital device may scroll the plurality of contents by using the slide touch input moving at the edge part of the side region 1320 and the rear area (not shown). That is, the digital device 100 may display the plurality of contents and the first interface 210 on the first display area 1310. At this time, the digital device 100 may control the first interface 210 through the slide touch input for touching the side region 1320, as described above.

Figure 14:
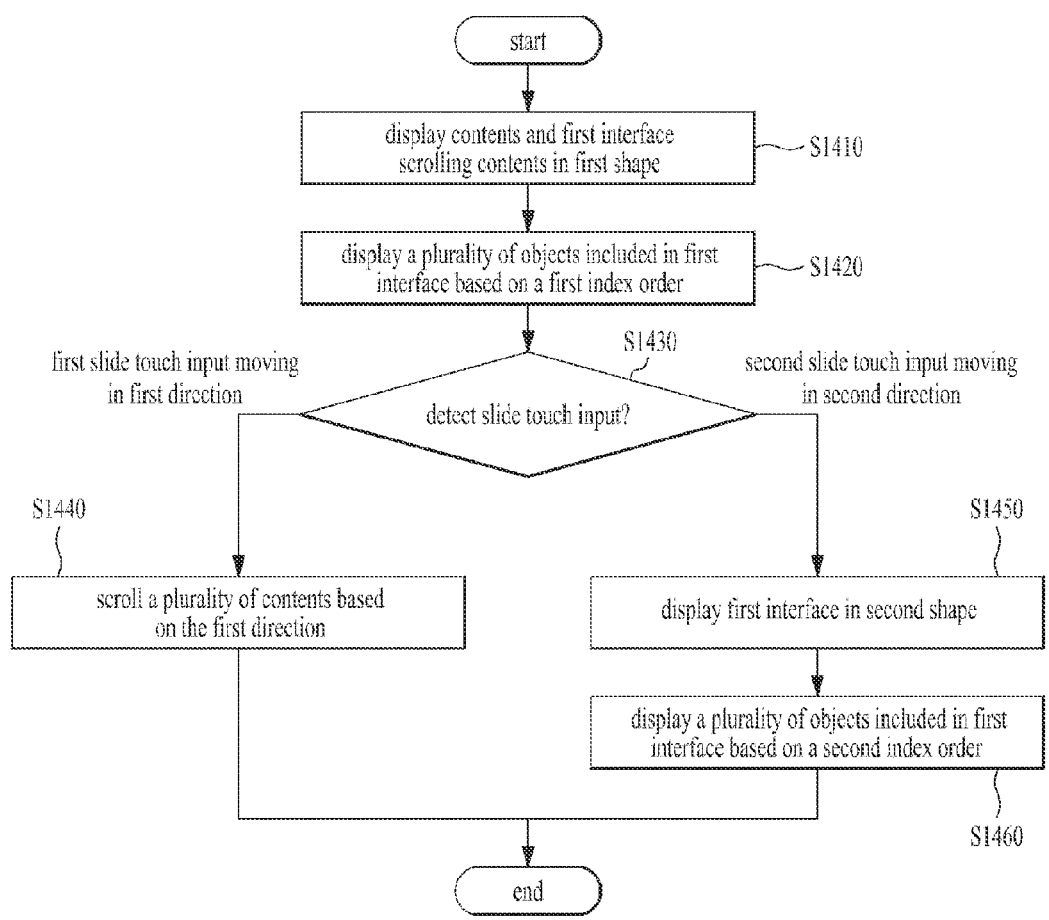
FIG. 14 is a diagram illustrating a method for controlling a digital device in accordance with one embodiment of the present specification.

FIG. 14 is a diagram illustrating a method for controlling a digital device in accordance with one embodiment of the present specification. The digital device 100 may display contents and a first interface for scrolling the contents in a first shape (S1410). At this time, as described with reference to FIG. 1, the contents may be applications, icons, stored contact addresses, stored images, and stored bookmark lists. In more detail, for example, if the user implements an application for contact addresses, each of the contact addresses stored individually may be one content. That is, the contact address application may include a plurality of contents. For another example, if the user implements a gallery application, one image may be one content. That is, the contents may be visual information scrolled by an index interface, and are not limited to the aforementioned examples.

Next, the digital device 100 may display a plurality of objects included in the first interface based on a first index order (S1420). At this time, as described with reference to FIG. 1, the first index order may be a language arrangement order, a number arrangement order, etc. Also, the first index order may be set based on the display order of the contents. That is, the first index order may be the same order as the display order of the contents.

Next, the digital device 100 may detect a slide touch input (S1430). At this time, as described with reference to FIG. 1, the slide touch input may be a touch input detected by the touch sensor unit 120.

Next, if the digital device 100 detects a first slide touch input moving in a first direction, the digital device 100 may scroll the plurality of contents based on a first direction (S1440). At this time, as described with reference to FIG. 3*a*, the first direction may be the direction moving within the first interface. For example, the first direction may be the direction moving from a first object to a second object within the first interface. For another example, the first direction may be the direction moving from the second object to the first object. That is, the first direction may be the direction moving in the first interface, and is not limited to the aforementioned examples. At this time, the digital device 100 may scroll the plurality of contents.

Next, if the digital device 100 detects a second slide touch input moving in a second direction, the digital device 100 may display the first interface in a second shape (S1450). At this time, as described with reference to FIG. 3*b*, the second direction may be the direction moving from the inside of the first interface to the outside of the first interface. That is, the second direction may be the direction moving from the inside of the first interface to the outside of the first interface, and is not limited to the aforementioned example.

Next, the digital device 100 may display a plurality of objects included in the first interface based on a second index order (S1460). At this time, as described with reference to FIG. 3*b*, the second index order may be the order of first and second parts displayed based on different sequences in the second shape. In more detail, the digital device 100 may display the plurality of objects in the first part based on a first sequence. Also, the digital device 100 may display the plurality of objects in the second part based on a second sequence. At this time, the first sequence and the second sequence may be the orders of the objects displayed in their respective directions different from each other.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

Also, the digital device 100 and the method for controlling the same according to the present specification are not limited to the aforementioned embodiments, and all or some of the aforementioned embodiments may selectively be configured in combination so that various modifications may be made in the aforementioned embodiments.

In the meantime, the digital device 100 and the method for controlling the same according to the present specification may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

In this specification, both the product invention and the method invention have been described, and description of both inventions may be made complementarily if necessary.

What is claimed is:

1. A digital device comprising:
a display unit configured to display a plurality of contents;
a touch sensor unit configured to detect a touch input on the display unit; and
a processor configured to control the display unit and the touch sensor unit, the processor further configured to:
display a first interface for scrolling the plurality of contents in a first shape, wherein the first interface in the first shape includes a plurality of objects corresponding to the plurality of contents,
scroll the plurality of contents based on a first direction when a first slide touch input moving in the first direction is detected on the first interface, and
display the first interface in a second shape when a second slide touch input moving in a second direction is detected on the first interface in the first shape,
wherein the first interface in the second shape has a first part including at least one specified object among the plurality of objects which have been included in the first interface in the first shape and a second part including remaining objects among the plurality of objects,
wherein the first interface in the first shape is divided into the first and second parts of the first interface in the second shape at a position where the second slide touch input is detected and the remaining objects in the second part are listed consecutive to the at least one specified object in the first part, and
wherein the plurality of objects included in the first part are displayed based on a first sequence, and the plurality of objects included in the second part are displayed based on a second sequence, such that consecutive letters are adjacent to each other.

2. The digital device according to claim 1, wherein a first content corresponding to a first object is displayed when a first control input selecting the first object included in the first interface is detected and a second content corresponding to a second object is displayed when a second control input selecting the second object included in the first interface is detected, and
wherein the first direction is a moving direction from a first position where the first object is displayed to a second position where the second object is displayed, within the first interface.

3. The digital device according to claim 1, wherein the second direction is the direction moving the inside of the first interface to the outside of the first interface.

4. The digital device according to claim 1, wherein each of the plurality of objects is thumbnail information corresponding to each of the plurality of contents, and
wherein the processor is further configured to set the first sequence based on content property of the contents.

5. The digital device according to claim 4, wherein the content property includes at least one of an occurrence order of contents, names of contents, sizes of contents, and shapes of contents.

6. The digital device according to claim 1, wherein the processor is further configured to set the second shape of the first interface based on the second direction of the second slide touch input.

7. The digital device according to claim 6, wherein the processor is further configured to:
set the second shape of the first interface based on the first position when the second slide touch input moving in the second direction is detected at the first position within the first interface.

8. The digital device according to claim 7, wherein the processor is further configured to display the at least one specified object on the first part of the first interface based on a first sequence and display the remaining objects on the second part of the first interface based on a second sequence, and
wherein the second sequence is opposite to the first sequence.

9. The digital device according to claim 8, wherein the first part and the second part of the first interface are divided from each other based on the first position.

10. The digital device according to claim 9, wherein the processor is further configured to:
display the first interface in the first shape, set a third position at a position corresponding to the second object, and display the plurality of objects based on the first sequence when a third slide touch input moving from the second position corresponding to the second object located in the second part to the third position located in the first part is detected.

11. The digital device according to claim 7, wherein the processor is further configured to:
display the first interface in a third shape based on a third direction when the second slide touch input moving in the third direction is detected at a second position within the first interface in a state that the second slide touch input is not released,
wherein the third direction is the direction moving from the inside of the first interface to the outside of the first interface.

12. The digital device according to claim 7, wherein the processor is further configured to:
if the first interface is displayed in the second shape, scroll the plurality of contents when detecting that the second slide touch input is moved within the first interface in a state that the second slide touch input is not released.

13. The digital device according to claim 7, wherein the processor is further configured to:
if the first interface is displayed in the second shape,
display the first interface in the first shape when the second slide touch input is released.

14. The digital device according to claim 1, wherein the display unit includes a first display area and a second display area.

15. The digital device according to claim 14, wherein the first display area is set on a front region of the digital device and the second display area is set on a side region of the digital device,
wherein the front region and the side region are identified from each other by at least one edge.

16. The digital device according to claim 15, wherein the processor is further configured to:
display the first interface on the first display area when the first interface is displayed in the first shape.

17. The digital device according to claim 15, wherein the processor is further configured to:
display the first part of the first interface on the first display area and display the second part of the first interface on the second display area when the first interface is displayed in the second shape.

18. The digital device according to claim 1, wherein the first sequence is at least one of a language arrangement order and a number arrangement order.

19. The digital device according to claim 1, wherein the display unit and the touch sensor unit are one unified touch sensitive display unit.

20. A method for controlling a digital device, the method comprising:
- displaying a plurality of contents and a first interface scrolling the plurality of contents in a first shape, wherein the first interface in the first shape includes a plurality of objects corresponding to the plurality of contents;
- displaying the plurality of objects included in the first interface having the first shape based on a first index order;
- scrolling the plurality of contents based on a first direction in response to a first slide touch input moving in the first direction on the first interface;
- displaying the first interface in a second shape in response to a second slide touch input moving in a second direction on the first interface in the first shape,
- wherein the first interface in the second shape has a first part including at least one specified object among the plurality of objects which have been included in the first interface in the first shape and a second part including remaining objects among the plurality of objects, and
- wherein the first interface in the first shape is divided into the first and second parts of the first interface in the second shape at a position where the second slide touch input is detected; and
- displaying the plurality of objects included in the first interface having the second shape based on a second index order,
- wherein the remaining objects in the second part are listed consecutive to the at least one specified object in the first part, and
- wherein the plurality of objects included in the first part are displayed based on a first sequence, and the plurality of objects included in the second part are displayed based on a second sequence, such that consecutive letters are adjacent to each other.

* * * * *